(12) United States Patent
Mnich

(10) Patent No.: US 10,284,110 B2
(45) Date of Patent: May 7, 2019

(54) POWER SUPPLY HAVING FOUR QUADRANT CONVERTER AND TECHNIQUES FOR OPERATION

(71) Applicant: ESAB AB, Gothenburg (SE)

(72) Inventor: Andrzej Mnich, Gothenburg (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 15/626,274

(22) Filed: Jun. 19, 2017

(65) Prior Publication Data

US 2018/0367060 A1    Dec. 20, 2018

(51) Int. Cl.
- *H02M 3/24*   (2006.01)
- *H02M 7/48*   (2007.01)
- *H02M 3/315*  (2006.01)
- *H02M 7/523*  (2006.01)

(Continued)

(52) U.S. Cl.
CPC ......... *H02M 7/4826* (2013.01); *B23K 9/1043* (2013.01); *H02M 3/3155* (2013.01);
(Continued)

(58) Field of Classification Search
CPC ............ H02M 3/22; H02M 3/24; H02M 3/28; H02M 3/325; H02M 2001/0067;
(Continued)

(56) References Cited

U.S. PATENT DOCUMENTS

| 8,908,401 B2 | 12/2014 | Hiltbrunner et al. |
| 9,046,907 B2 | 6/2015 | Molaro et al. |

(Continued)

FOREIGN PATENT DOCUMENTS

| CN | 1794549 A | 6/2006 |
| JP | 2005103569 A | 4/2005 |

OTHER PUBLICATIONS

Notification of Transmittal of International Search Report and Written Opinion, including International Search Report and Written Opinion for International Application No. PCT/IB2018/054393, dated Sep. 25, 2018, 15 pages.

(Continued)

*Primary Examiner* — Alex Torres-Rivera
(74) *Attorney, Agent, or Firm* — Edell, Shapiro & Finnan, LLC

(57) ABSTRACT

A power supply, including a primary pre-converter, coupled to supplying mains, configured to receive an AC voltage at low frequency and output a high DC voltage, and further configured to receive the high DC voltage and to output the alternating current; a primary converter, disposed on a primary side of the power supply, coupled to the high DC voltage from the primary pre-converter; an isolating transformer to receive the high frequency AC voltage and output a high frequency secondary AC voltage, and to receive a high frequency secondary AC current and to output primary high frequency AC current; and an output converter, on a secondary side of the power supply, wherein the output converter is configured to receive high frequency AC voltage from the isolating transformer and to output a DC voltage of a first or second polarity to an output, and wherein the output converter is configured to receive DC current of a first or second direction from the output and to output a high frequency AC current to the isolating transformer.

17 Claims, 17 Drawing Sheets

(51) Int. Cl.
*H02M 7/505* (2006.01)
*H02M 3/335* (2006.01)
*H02M 5/458* (2006.01)
*H02M 7/797* (2006.01)
*B23K 9/10* (2006.01)

(52) U.S. Cl.
CPC ..... *H02M 3/33584* (2013.01); *H02M 5/4585* (2013.01); *H02M 7/48* (2013.01); *H02M 7/4807* (2013.01); *H02M 7/505* (2013.01); *H02M 7/5236* (2013.01); *H02M 7/797* (2013.01)

(58) Field of Classification Search
CPC .......... H02M 2001/007; H02M 3/305; H02M 3/315; H02M 3/3155; H02M 3/33584
USPC ............. 363/15, 16, 17, 27, 28; 307/46, 127
See application file for complete search history.

(56) References Cited

U.S. PATENT DOCUMENTS

| | | |
|---|---|---|
| 9,130,461 B2 | 9/2015 | Alexander |
| 9,369,059 B2 | 6/2016 | Angkititrakul et al. |
| 9,450,500 B2 | 9/2016 | Zimmanck |
| 2010/0052423 A1* | 3/2010 | Shimada ............ H02M 3/33507 307/43 |
| 2010/0177536 A1* | 7/2010 | Liu ................... H02M 3/33592 363/17 |
| 2012/0153729 A1* | 6/2012 | Song ...................... H02J 7/0013 307/82 |
| 2014/0112043 A1* | 4/2014 | Yamahira .............. H02M 5/293 363/127 |
| 2014/0328086 A1* | 11/2014 | Hueckel .................. H02M 1/36 363/17 |
| 2015/0070939 A1* | 3/2015 | Gupta ...................... H02J 3/36 363/17 |
| 2016/0079881 A1* | 3/2016 | Barbosa .................. H02M 7/49 307/11 |
| 2016/0276941 A1* | 9/2016 | Iwaya ............... H02M 3/33584 |

OTHER PUBLICATIONS

Arvindan, A.N. et al., Current Control of a High Power Factor Improved Power Quality Four Quadrant AC-DC Converter, Industrial Technology, 2006. ICIT 2006, IEEE International Conference on, IEEE, p. 1, Dec. 1, 2006, pp. 1397-1402.

* cited by examiner

POWER SUPPLY HAVING FOUR QUADRANT CONVERTER AND TECHNIQUES FOR OPERATION

TECHNICAL FIELD

The present embodiments are related to general switched mode power supplies originated as for welding type power, that is, power generally used for welding, cutting, or heating, but applicable above and beyond.

BACKGROUND

A power supply (PS), in particular a switched mode power supply (SMPS) converts electric energy taken from a primary source of electrical power to electrical energy having parameters different than parameters of energy from the primary source. In particular, a PS intended for welding purposes may deliver electric power of direct current (DC) and alternate current (AC). The latter type of PS is often used for submerged arc welding (SAW) and gas tungsten arc welding (GTAW), better known as tungsten inert gas (TIG) welding. Welding processes conducted with alternating current have many challenges, but due to technological difficulties in welding of certain metals and alloys as well as welding of elements of certain geometrical form and position, AC welding may be an appropriate choice.

There are a number of disadvantages, special requirements and conditions related to AC welding. In AC welding, the polarity of the voltage and direction of the current are periodically changing, such as at a rate of 10 Hz to 1000 Hz, merely as an example. This periodic change means that at certain points in time the current crosses a zero value, resulting in a condition where there is no electric arc and the output circuit is open. During a zero crossing event, the change of voltage polarity precedes the change of current direction. The explanation for this relationship lies in the presence of an inductance in the output circuit. After the change of voltage polarity, first the electric arc or conductive path must be restored. Once conduction is restored, the current rises up, with a rate dependent on voltage capacity and a sum of inductances in the output circuit. In AC power supplies using sinusoidal AC current, the voltage changes in a sinusoidal way at low frequencies. Usually the change is not fast enough to ignite arc plasma particles present in the electric arc, which particles disappear rapidly from the space between weld electrodes. In this circumstance, just a high voltage can ignite arc again. Usually, in an AC welding power supply with sinusoidal output, an ignition unit is used to generate a high voltage surge during every change of the polarity, which circumstance is undesirable for several reasons. In particular, the ignition unit may be a high voltage, high frequency generator, which unit produces copious amounts of electromagnetic interference of very high frequency. An alternative way of arc ignition is to establish voltage of the opposite polarity and increase current of the opposite direction as fast as is possible. Regarding the last requirement, the current at least should undergo direction reversal in a range of current near the zero point, large enough to sustain the electric arc as long as possible, then sustain the arc after ignition with reverse polarity. The limitation of a fast current transition to the initial range arises from a trade-off between process stability and the limitation of the contents of high frequency harmonics of the current. In particular, high frequency harmonics of the welding current invokes effects including: a) high levels of acoustic noise, b) high levels of high frequency magnetic field around the power cables, and c) high frequency losses in the power cables. In any case, a solution for AC current welding is useful if providing rapid changes of the output voltage and the output current.

Another challenge in AC welding is the ignition of an arc after change of polarity. Even under conditions of rapid voltage change, the voltage level may not be sufficient to ignite the arc after polarity change. Therefore, power supplies that can deliver increased voltage are desirable. This feature also addresses the demand for high rate of the current change. Notably, TIG welding power supplies usually contain an inductor, operating temporarily as very high voltage transformer, connected in series, having an inductance more than one order of magnitude larger compared to the inductance of the rest of the circuit. This inductor has very low saturation current, on level of a few amps, but still opposes buildup of the current until saturated, and may accordingly significantly affect ignition of the arc after polarity change.

Another challenge is power supply efficiency. SMPSs deliver energy through a high frequency transformer. The high frequency AC voltage is rectified to DC voltage on the secondary side, where the DC voltage is then converted to low frequency AC voltage by means of a power inverter, which inverter should be capable of delivering alternate current in the entire predicted range. This inverter is an additional link in power conversion, which link decreases efficiency and increases costs.

With respect to these and other considerations, the present disclosure is provided.

BRIEF SUMMARY

Various embodiments are directed to power supplies that comprise a primary converter that can invert direct current voltage to high frequency alternating current voltage and rectify high frequency alternating current, an isolating high frequency transformer and an output converter that can rectify high frequency voltage and invert direct current at high frequency.

In one embodiment, a power supply may include a primary pre-converter, coupled to receive power from supplying mains, configured to receive an AC voltage at low frequency and output a high DC voltage, and further configured to receive the high DC voltage and to output the alternating current; a primary converter, disposed on a primary side of the power supply, coupled to the high DC voltage from the primary pre-converter; an isolating transformer to receive the high frequency AC voltage and output a high frequency secondary AC voltage, and to receive a high frequency secondary AC current and to output primary high frequency AC current; and an output converter, on a secondary side of the power supply, wherein the output converter is configured to receive high frequency AC voltage from the isolating transformer and to output a DC voltage of a first or second polarity to an output, and wherein the output converter is configured to receive DC current of a first or second direction from the output and to output a high frequency AC current to the isolating transformer.

In another embodiment, a method of operating a switched mode power supply, may include providing a primary converter on a primary side of the switched mode power supply, the primary converter arranged to output a high frequency AC voltage and to rectify high frequency AC current. The method may further include providing an output converter, the output converter disposed on a secondary side of the switched mode power supply and coupled to the primary converter through an isolating transformer; and synchronizing operation of the primary converter and the output converter, wherein the power supply operates in four different modes of operation.

DESCRIPTION OF EMBODIMENTS

Various embodiments provide architectures of power supplies based upon power converters, where an output inverter makes up an embedded part of the power converter, or more precisely combines functions of a rectifier and inverter. In comparison to known apparatus, the present embodiments provide a four quadrant converter topology where control of the output is provided by transitions from the first quarter (positive output voltage, positive output current) to the fourth quarter (negative output voltage, positive output current) and from the third quarter (negative output voltage, negative output current) to the second quarter (positive output voltage, negative output current). Such a topology and technique enable faster transitions of a current and provides for reverse flow of the energy, improving the overall efficiency of the PS.

As detailed in the discussion and FIGs. to follow, compared to known apparatus intended for AC welding containing secondary rectifiers and a secondary inverter, the present embodiments contain one output converter having a topology and control mechanism where the rectifying function is superimposed with the inverting function, and more particularly where the same devices may be used for rectification or inversion, and where physical extraction of the rectifier of inverter is not possible.

As discussed below, the present embodiments also enable embedded synchronous rectification and further improvements of power conversion efficiency in power supplies. While some figures are directed specifically to welding power supplies the present embodiments may cover other power supplies. In particular, the present embodiments may be applied to power supplies of an isolated output that supply a load, where an output side can consume power as well as produce power depending on conditions, or is expected to change polarity or deliver low frequency AC voltage.

Figure 1:
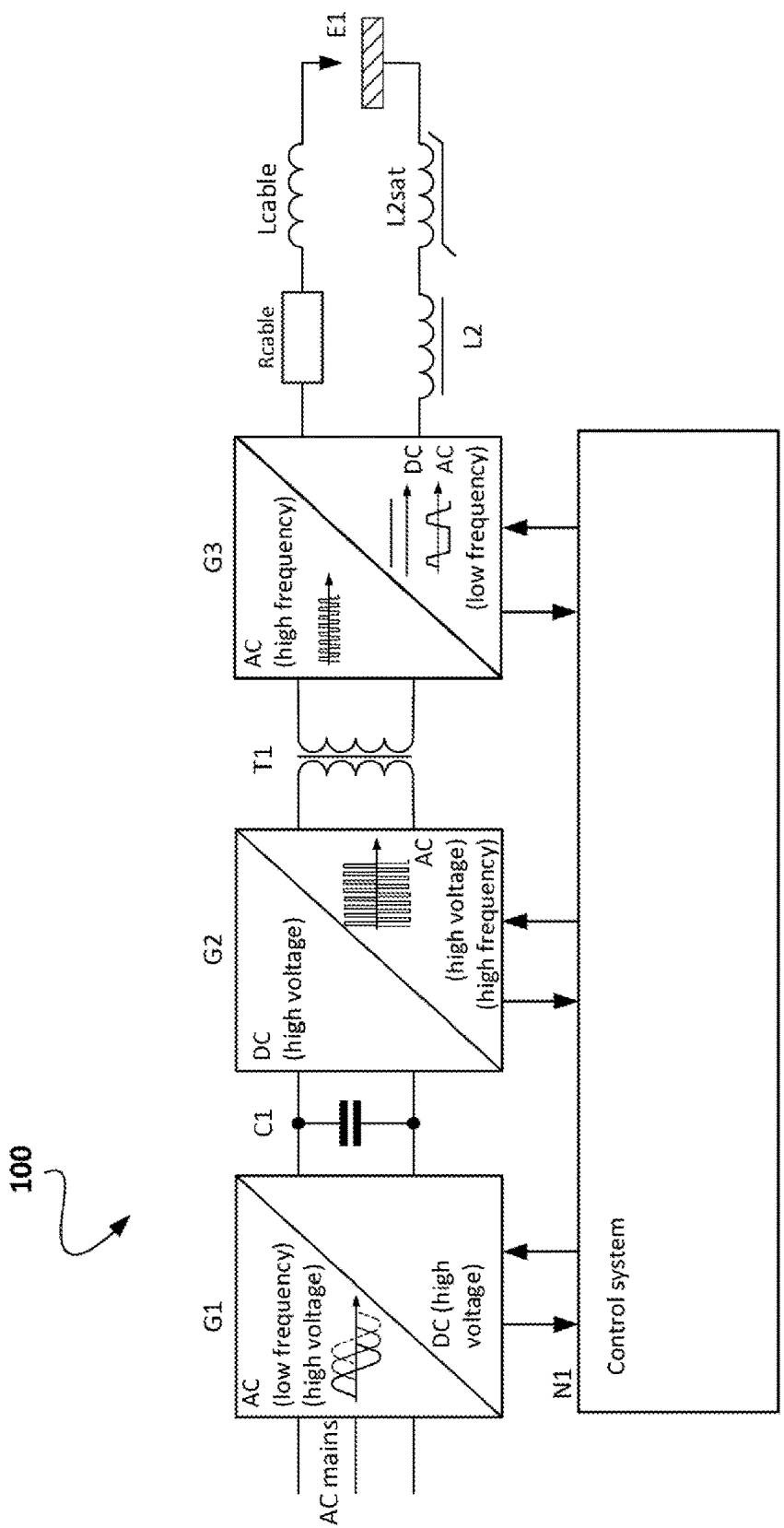
FIG. 1 presents a welding power supply, according to various embodiments of the disclosure.

FIG. 1 presents a welding power supply 100, according to various embodiments of the disclosure. The welding power supply 100 may contain a primary converter, shown as AC/DC pre-converter G1, a DC link with an energy buffer in form of the capacitor C1, a high frequency primary converter, shown as primary converter G2, an isolating transformer T1 with primary and secondary windings, and an output converter G3.

The primary pre-converter G1 may receive a low frequency AC voltage such as power from a supplying means, such as an input mains power at 50 Hz or 60 Hz, and output a DC link voltage, such as a high DC voltage. In some embodiments, the voltage that is output by primary pre-converter G1 may range between 100 V and 1000V. For example, in different embodiments the primary pre-converter G1 may or may not include a boost converter, buck-boost converter, controlled rectifier, to output a constant voltage DC link, independent of the voltage received from an AC input mains. In other embodiments, the primary pre-converter G1 may output a DC voltage on the DC link that is proportional to the AC input voltage received by the primary converter G1. In certain embodiments, a primary pre-converter may perform a role of an inverter, transferring the energy from the DC link capacitor C1 to AC mains.

The primary converter G2 may operate at a high frequency, such as a frequency greater than 10 kHz, and in some examples, in the range of 10 kHz to 500 kHz or more. The primary converter G2 may operate as a voltage inverter (primary inverter) and may receive DC voltage from the DC link and output AC voltage of high frequency. The primary converter G2 may also operate as a rectifier and may receive AC current of high frequency generated by the output converter G3 from the isolating transformer T1 and output DC current to the DC link. The primary converter G2 may indirectly control the operation of the secondary converter, that is, the output converter G3, by means of forcing different states of the output of isolating transformer. The embodiments are not limited in this context.

The isolating transformer T1 may receive high voltage, high frequency AC voltage from the primary converter G2 and convert the received high voltage to isolated secondary high frequency AC voltage, or may receive high frequency AC current from the output converter G3 and output high frequency isolated AC current to the primary converter G2.

The output converter G3 may operate as a rectifier and then may receive isolated secondary high frequency AC voltage and output DC voltage. The output converter G3 may also operate as a current inverter and then receive DC current and output high frequency AC current. In embodiments of known art of power supplies intended for AC welding due to topology of the output converter the operation in the mode of the current inverter is not possible.

The output converter G3 may operate in both polarities of the output voltage and both directions of the output current. Consequently output converter G3 may output DC voltage of both polarities or output AC voltage of the low frequency, in the range of 10 Hz up to 1000 Hz.

The output power receiver may contain electric arc welding load E1 (including an electric arc plasma, other conductive components of the welding) and serial inductances of the output inductor L2 and inductances of supplying cables Lcable. The welding load is schematically shown as an electrode and a base material. In particular embodiments, the secondary side may also comprise a saturating inductor L2sat or transformer, which components make up an element of the ignition system, needed for the start of the welding process without short circuit of the electrode to the base material. The output power receiver is specific to the welding application, but embodiments are not limited in this context. In particular, the output power receiver can be any power receiver or power receiver that can switch roles to act as a power generator under condition that the output comprise at least one serial inductor equivalent to inductor L2.

A control system N1 governs switches in the primary converter G2 and switches in the secondary converter G3. In some embodiments the control system may also govern the switches in input AC/DC pre-converter G1. This function does not alter the operation of the present embodiments.

The primary converter G2 may control the power delivered to the secondary side by controlling the balance between the time of power delivery and time of idle or free-wheeling state. In a similar manner, the secondary converter G3 may control the power delivered to the primary side by the control of the balance between the time of power delivery and time of free-wheeling state.

Figure 2:
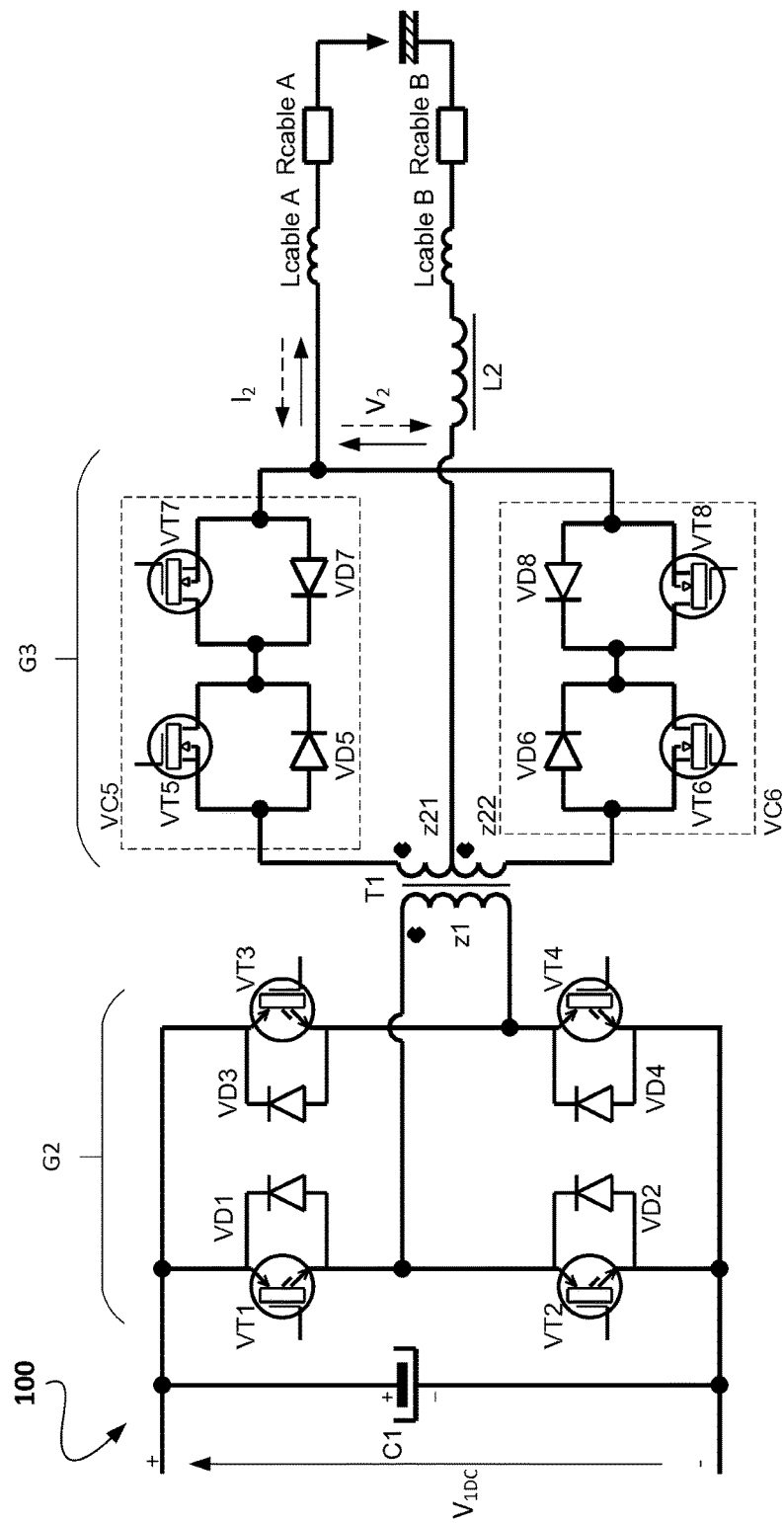
FIGS. 2-6 present different variants of the welding power supply of FIG. 1 according to additional embodiments.

FIG. 2 presents a more detailed depiction of one variant of the welding power supply 100. In this view, the input mains AC/DC pre-converter, that is primary pre-converter G1, is omitted for clarity, because the operation pre-converter G1 may not be related to the present embodiments of the disclosure. The primary converter G2 may be embodied in a FB topology, and is supplied from the primary DC link with an energy buffer—capacitor C1. The FB topology contains four active switches: VT1, VT2, VT3, and VT4, as well as four reverse rectifiers: VD1, VD2, VD3, and VD4. For illustrative purposes, active switches are shown in FIG. 2 as insulated gate transistor (IGBT), while the active switches may instead be formed using any type of suitable semiconductor switches. Isolating transformer T1 has one primary winding z1 and two secondary windings z21 and z22, connected together with a central tap (CTAP). In further embodiments, the transformer T1 may have additional secondary windings. The central tap is connected to the output, to the power receiver. In particular embodiments the central tap is connected to the output inductor L2. Outer ends of the secondary winding are connected to four state controlled conductivity switches, shown as controlled switch VC5, and controlled switch VC6. Four-state controlled conductivity switch VC5 is made up of series connection of two active switches, active switch VT5, and active switch VT7, while four-state controlled conductivity switch VC6 is made up of series connection of two active switches, active switch VT6, and active switch VT8. For illustrative purposes the active switches are shown as Metal-Oxide Semiconductor Field-Effect Transistors (MOSFET); in other embodiments the active switches (VT5-VT8) may be formed using any type of suitable semiconductor switches. Rectifiers VD5, VD6, VD7, VD8 are connected in parallel to the active switches VT5, VT6, VT7, VT8), respectively, providing reverse conductivity. Notably, the rectifiers providing reverse conductivity may be embodied as embedded parts of active switches.

In accordance with the present embodiments the four-state controlled conductivity switches (VC5 and VC6) are capable of providing one of four states of conductivity:
1. Bidirectional conductivity, enabling bidirectional power flow operation,
2. Conductivity in a first direction and blocking a current flow in a second direction,
3. Conductivity in the second direction and blocking the current flow in the first direction,
4. Blocking both directions of the current flow.

Figure 3:
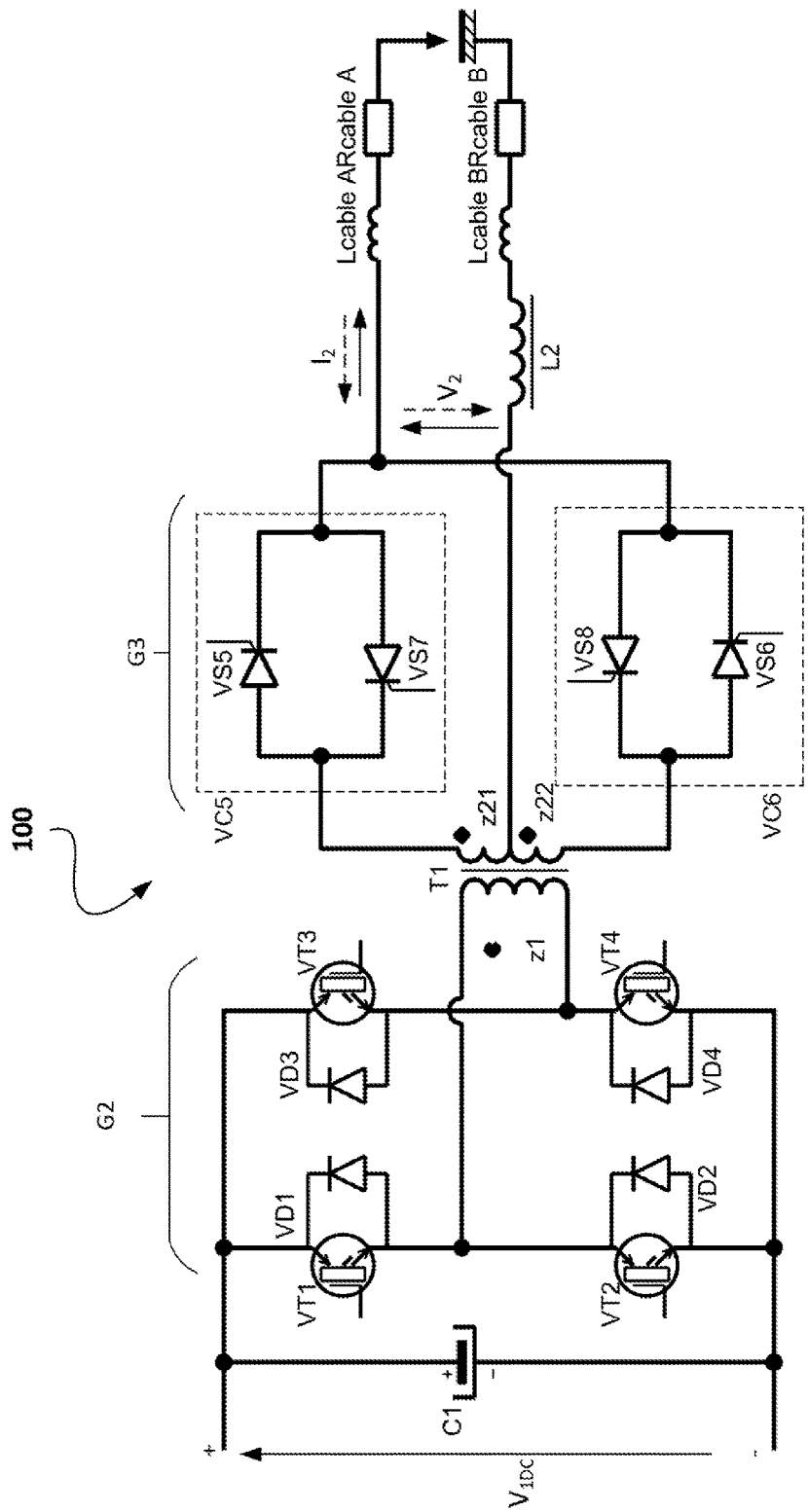

FIG. 3 shows another variant of the welding power supply 100. In this variant, to provide similar functionality, four-state controlled conductivity switch (VC5 and VC6) may alternatively be embodied as a parallel connection of two controlled rectifiers VS5, VS7, equivalent to thyristors, where VS5 can conduct current just in a first direction and VS7 can conduct current just in a second direction, opposite to the first direction. A second pair of controlled rectifiers, VS6 and VS8, is connected in the same way as controlled rectifiers VS5, VS7, as shown in FIG. 3.

Figure 4:
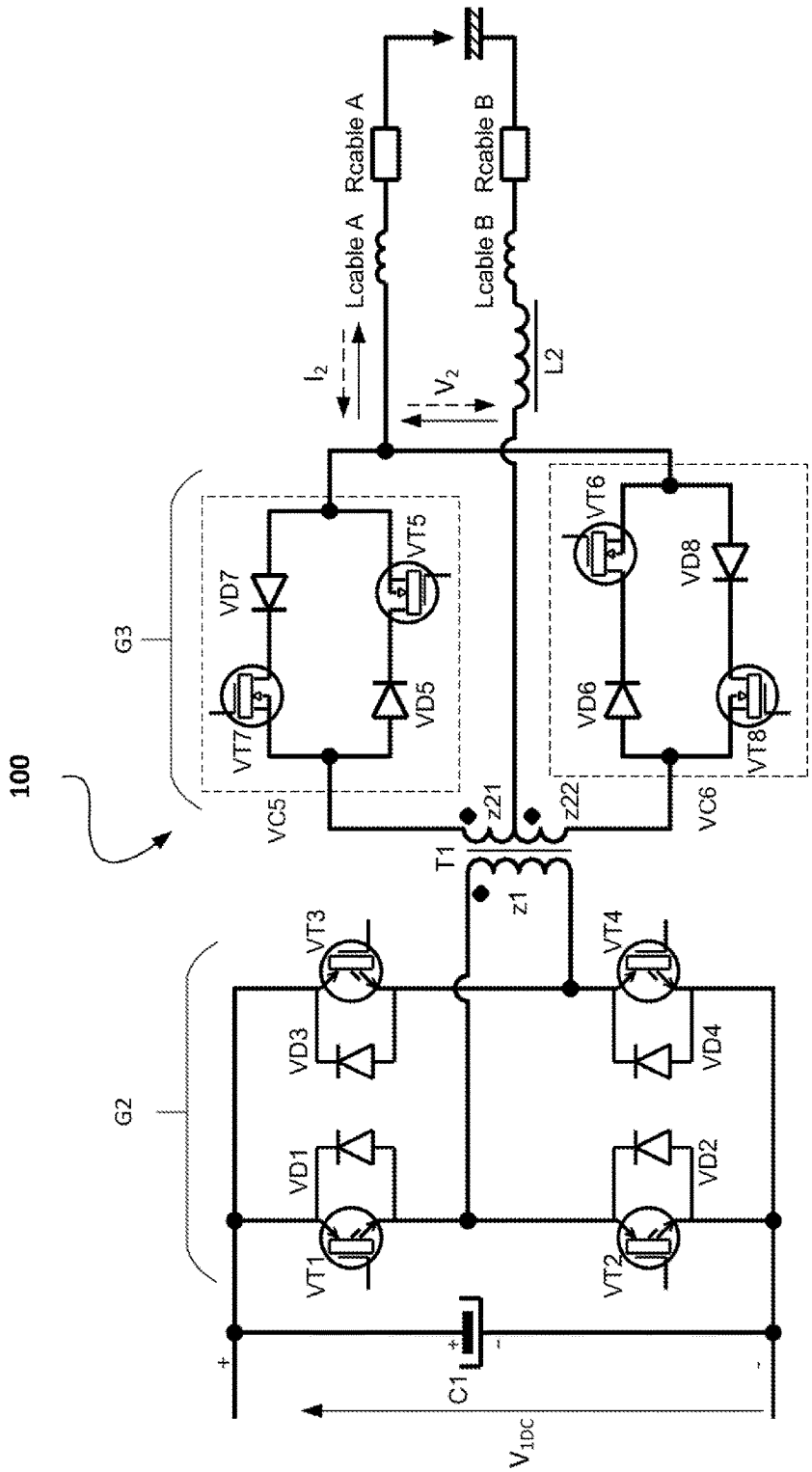

FIG. 4 shows another variant of the welding power supply 100. In this example, the controlled rectifiers, equivalent to thyristors as in FIG. 3, may be replaced by other controlled rectifiers in form of a series connection of a switch and a rectifier as shown. As in any series connection of two elements the order in series may be exchanged without a change of the functionality. In comparison to the variant of FIG. 2, the output converter circuit presented in FIG. 4 has no connections between the middle points between the active switch and the rectifier. There may be no substantial difference in operation of this alternative; notably, in practical implementation, the topology in FIG. 2 may provide lower conduction losses due to available reverse conductivity of switches. The last feature is typical of MOSFETs and is not available for IGBTs or bipolar transistors.

Figure 5:
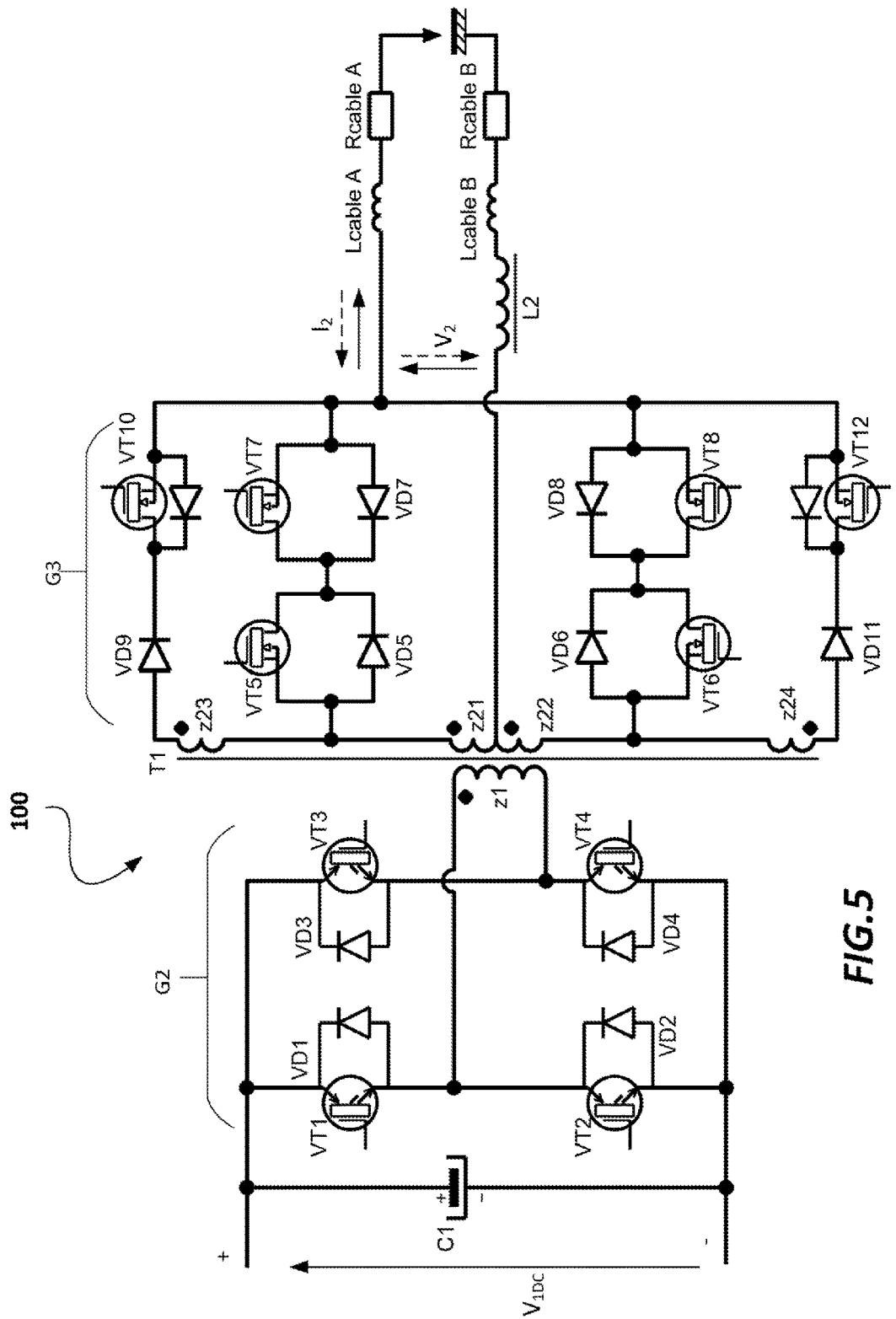

In order to provide increased voltage during changes of the current direction and for other purposes, the topology presented in FIG. 2 may be extended to a topology presented in a variant of welding power supply 100 shown in FIG. 5. Two additional, low power windings z23 and z24, are added in this variant of transformer T1 and are connected to outer ends of the windings z21, z22. The increased voltage available on the outer ends of windings z23, z24 may be temporarily connected to the output by means of the additional controlled rectifiers. These additional controlled rectifiers are represented by the serial connection of the rectifier VD9 and the switch VT10, as well as by the rectifier VD11 and the switch VT12. By means of operation of the switches VT10 and VT12 instead of switches VT7 and VT8, an increased output voltage of the first polarity is available.

Figure 6:
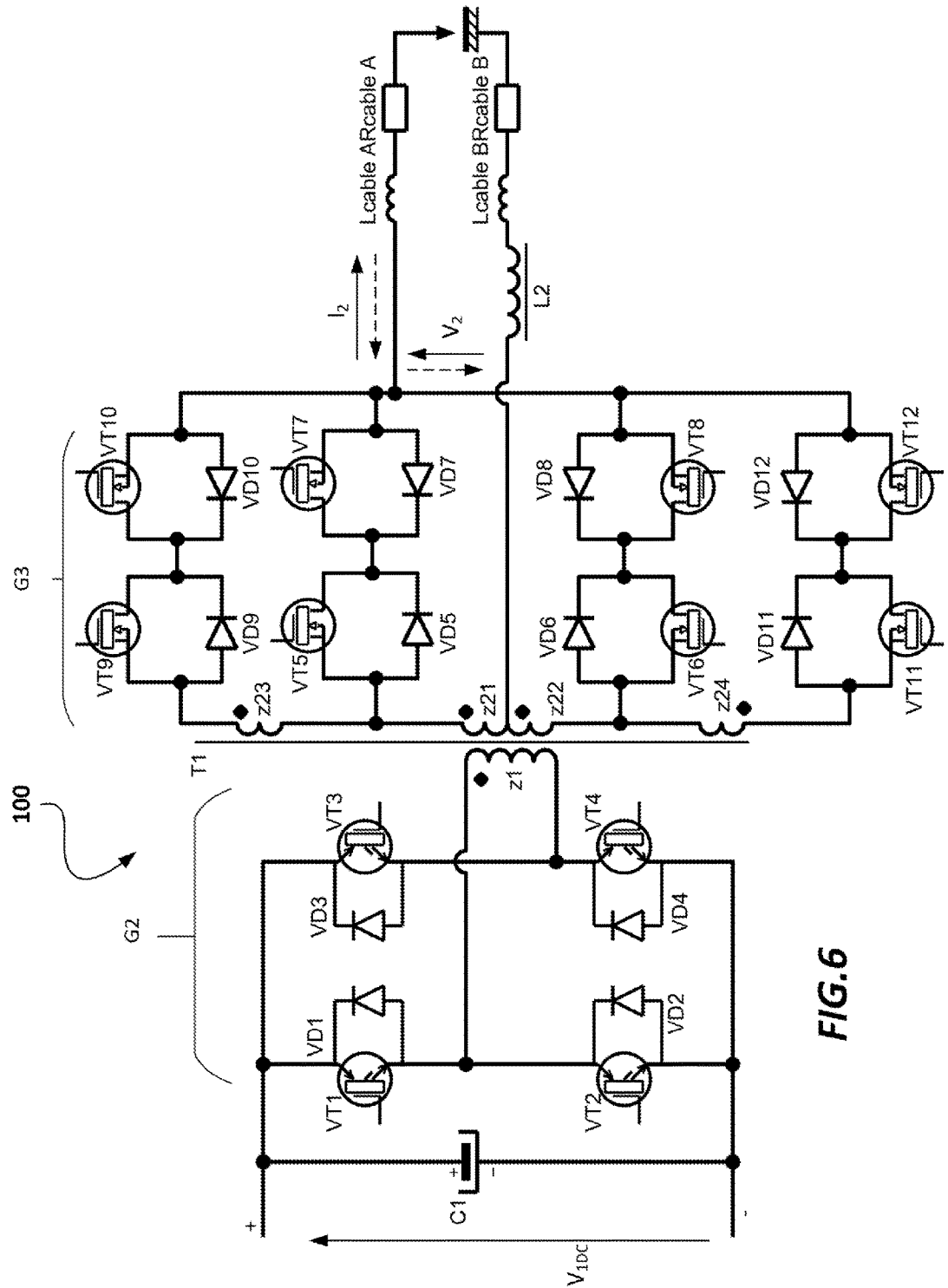

The topology presented in FIG. 5 can provide the increased voltage just of the first polarity, which topology may be insufficient for stabilization of the welding process. A further extension of topology is presented in FIG. 6. Four-state controlled conductivity switches may be connected to auxiliary windings z23, z24. As shown in FIG. 6, in comparison to the topology of FIG. 2, two auxiliary four-state controlled conductivity switches (that is, a first auxiliary four-state controlled conductivity switch and a second auxiliary four-state controlled conductivity switch) are provided for this capability, embodied in components (VT9, VT10, VT11, VT12, VD9, VD10, VD11, VD12). In this way, increased voltage of both polarities may be provided.

Turning now to FIGS. 7-16 there are shown different stages of exemplary operation of a welding power supply 100 arranged according to the variant of FIG. 2. Ten different stages of the converter may be defined, five for each direction of the output current. More particularly, in the various stages depicted in the figures to follow, the control system N1 may be used to control and synchronize the operation of switches in the primary converter G2 with the operation of switches in the output converter G3, as embodied in the variant of welding power supply 100 of FIG. 2. In practical embodiments more different stages of operation may be defined. For instance, if VT5, VT6, VT7, VT8 switches are MOSFETs, which switches expose bipolar conductivity in an ON state, utilizing this feature may be effective. Then certain transitions between stages may require a short intermittent stage, in order to restore blocking capacity of the MOSFET in a reverse direction, when the current is intended to be conducted by one of the diodes VD5, VD6, VD7, VD8, but not by the respective parallel switch VT5, VT6, VT7, VT8. For simplification of the description of the operation, all switches are assumed ideal, having a switching time equal to zero. With such an assumption, the additional four stages can be omitted.

Figure 7:
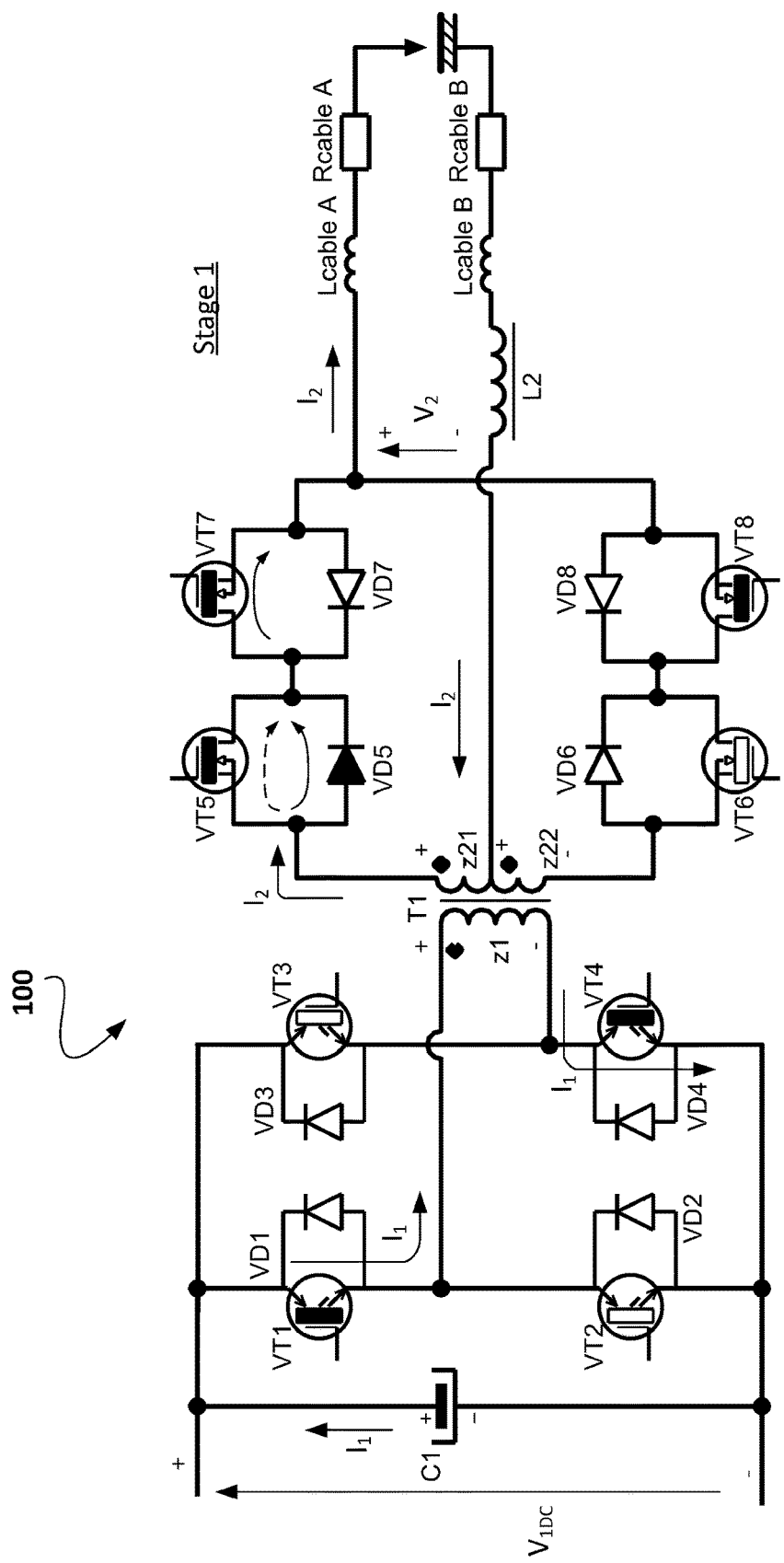
FIGS. 7-16 present different operating stages for operating a power supply according to embodiments of the disclosure.

In a first stage and second stage, power transfer from the primary side to secondary side takes place for a first output voltage polarity and output current of the first direction. Turning to FIG. 7 there is shown the operation where two primary switches VT1 and VT4 are switched on, providing voltage on the primary side with the polarity as shown. A secondary switch, VT7, is switched on, secondary current flows through the z21 winding, VD5 rectifier and VT7 switch. If the VT5 switch has capability of reverse conductivity, as a MOSFET, this switch may also conduct, providing a parallel path for the secondary current, as depicted by the dashed line. During stages 1, 2, and 3 both VT7 and VT8 switches may remain switched on. Notably, during stage 1 due to polarity of the voltage on the z22 windings, the VT8 switch does not conduct current.

Figure 8:
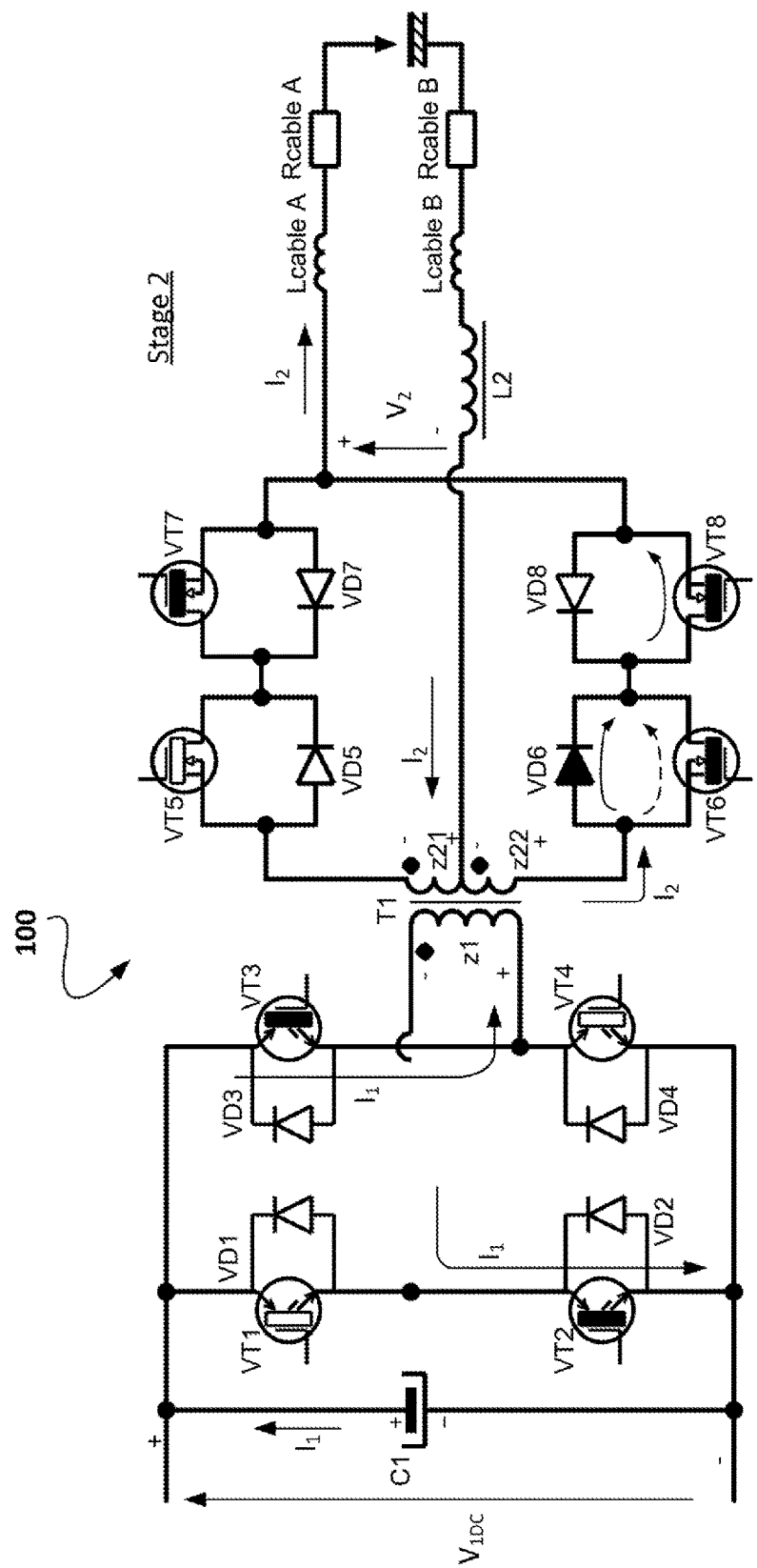

Turning to FIG. 8, there is shown a stage 2, analogous to stage 1. Primary switches VT2 and VT3 are switched on, while primary and secondary voltages have opposite polarity to the polarity in stage 1. The secondary current flows through the winding z22, rectifier VD6 and in a case where VT6 conducts in reverse direction, also through switch VT6 and then through the switch VT8. The output voltage still has the first polarity and output current still has the first direction, as shown.

Figure 9:
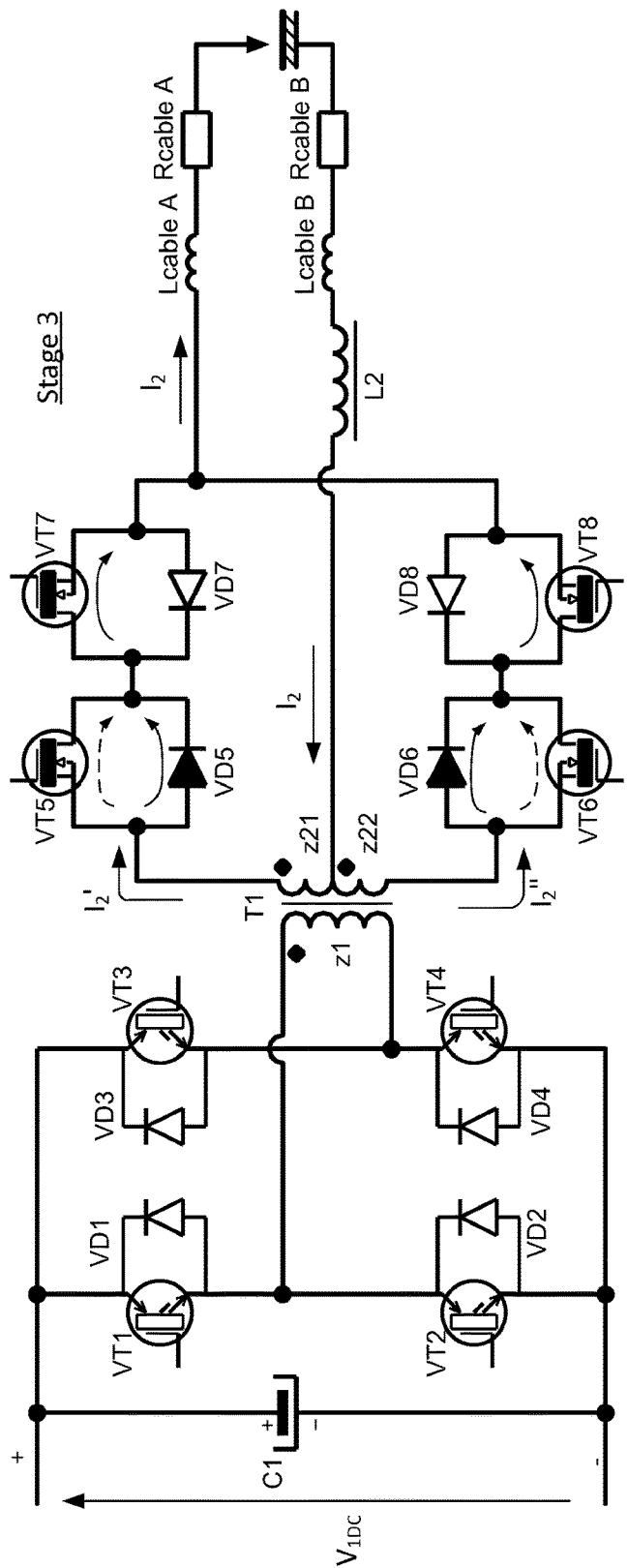

Turning to FIG. 9, there is shown a free-wheeling stage 3—free-wheeling operation at the current of the first direction. In this stage, all primary switches VT1, VT2, VT3, and VT4 are switched off. Since both switches VT7 and VT8 are switched on, the secondary current flows in parallel through the rectifiers, VD5 and VD6. In a case of application of the reverse conducting switches as MOSFETs, the current flows also through the switches VT5 and VT6.

Figure 10:
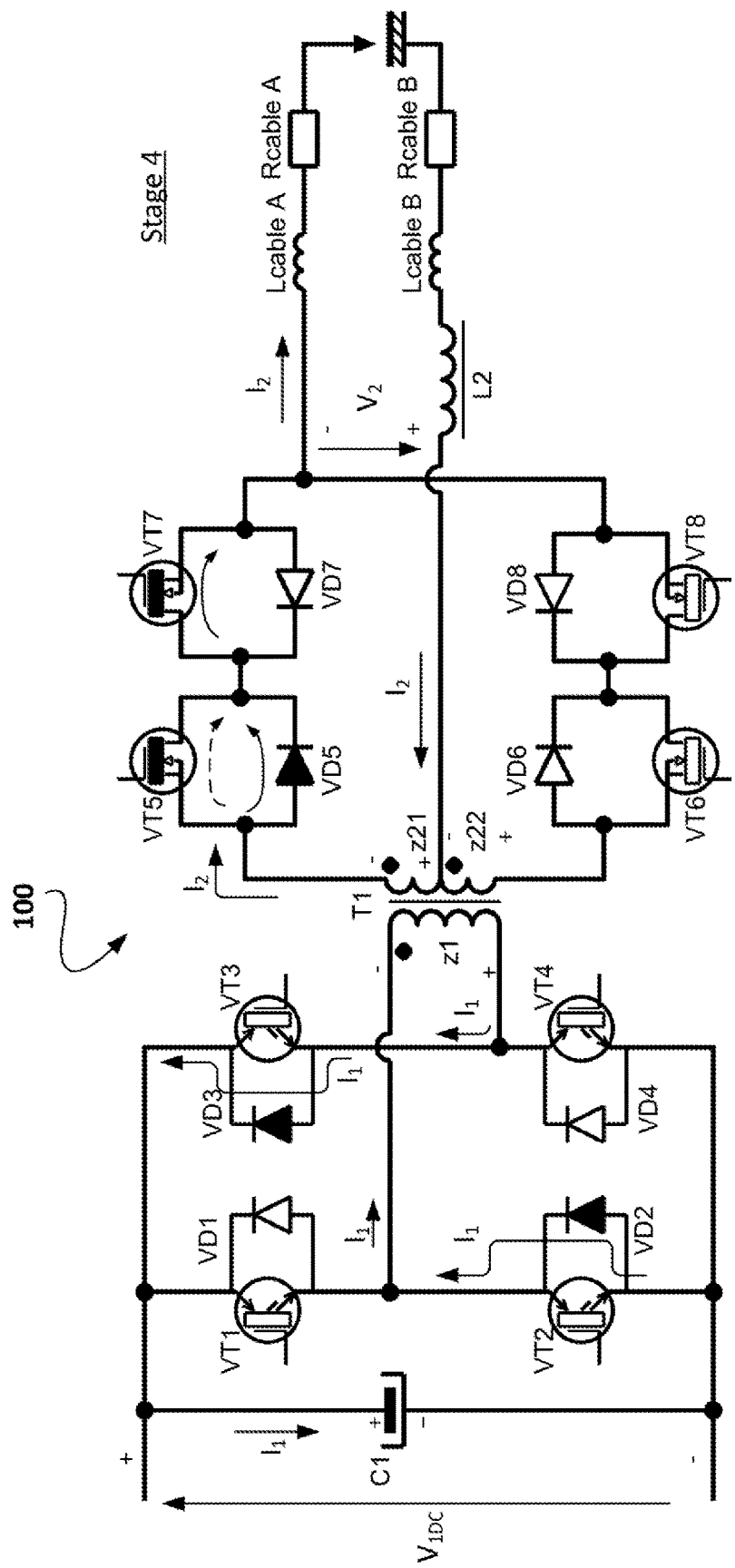

In stages 4 and 5, power transfer takes place from the secondary to the primary side, where the power is of a second output voltage polarity and a first output current direction, opposite to the voltage polarity. In stages 4 and 5 all primary switches are switched off. Conduction on the primary side is possible just through the primary rectifiers VD1, VD2, VD3, VD4, which rectifiers form a bridge rectifier. As shown in FIG. 10, in stage 4 the switch VT8 is switched off. Due to energy accumulated in the output inductors, the secondary current flows in the first direction. Secondary current flows through the switch VT7, rectifier VD5 and secondary winding z21. Since neither secondary windings nor primary windings are short-circuited, the secondary current is transformed to the primary side and flows back to the accumulating capacitor C1, via diodes VD2 and VD3, forcing the voltage of the second polarity on the transformer's winding. The energy accumulated in inductors flows back to the input capacitor C1.

Figure 11:
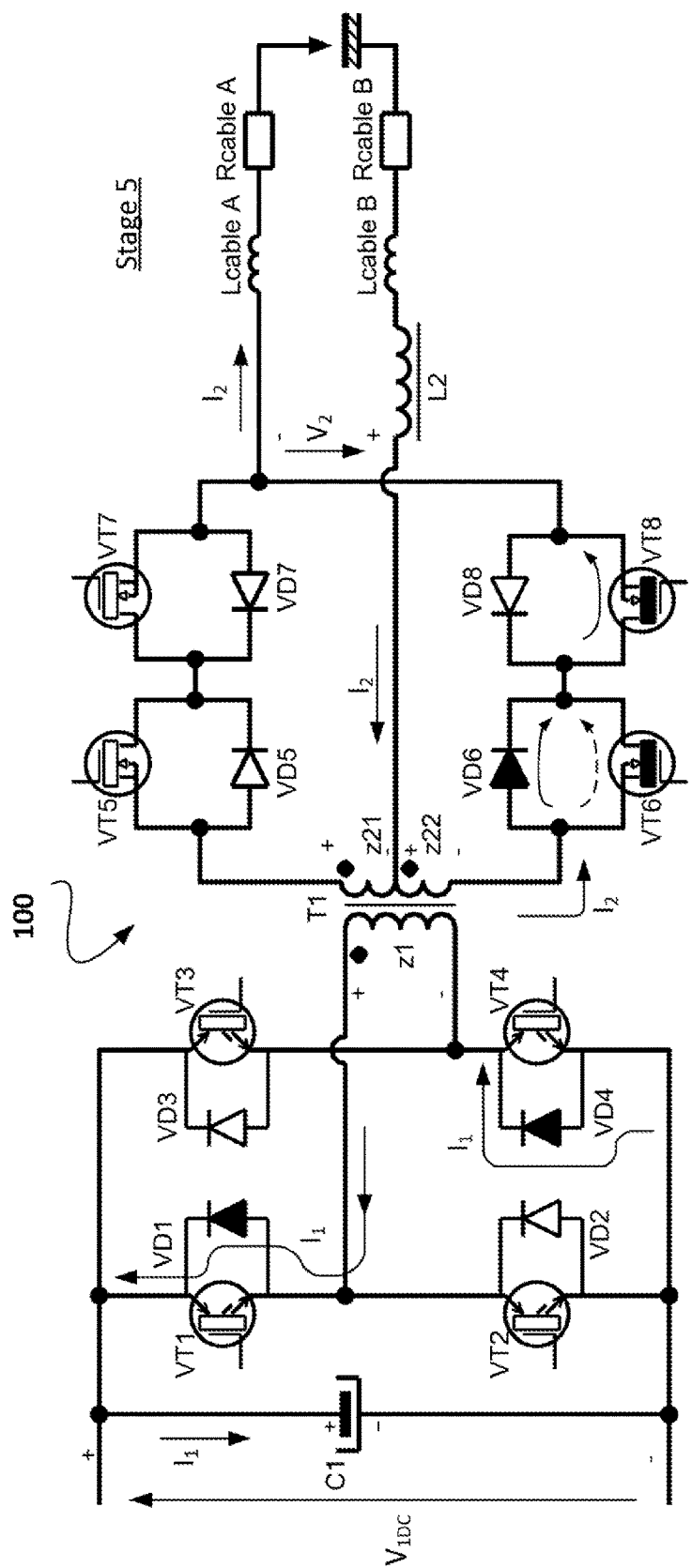

In analogous fashion to the scenario of FIG. 10, as shown in FIG. 11, in stage 5 the switch VT7 is switched off. Due to energy accumulated in the output inductors, the secondary current flows in the first direction. Secondary current flows through the switch VT8, rectifier VD6 and secondary winding z22. Since neither secondary windings nor primary windings are short-circuited, the secondary current is transformed to the primary side and flows back to the accumulating capacitor C1, via diodes VD1 and VD4, forcing the voltage of the second polarity on the transformer's winding. The energy accumulated in inductors flows back to the input capacitor C1.

Figure 12:
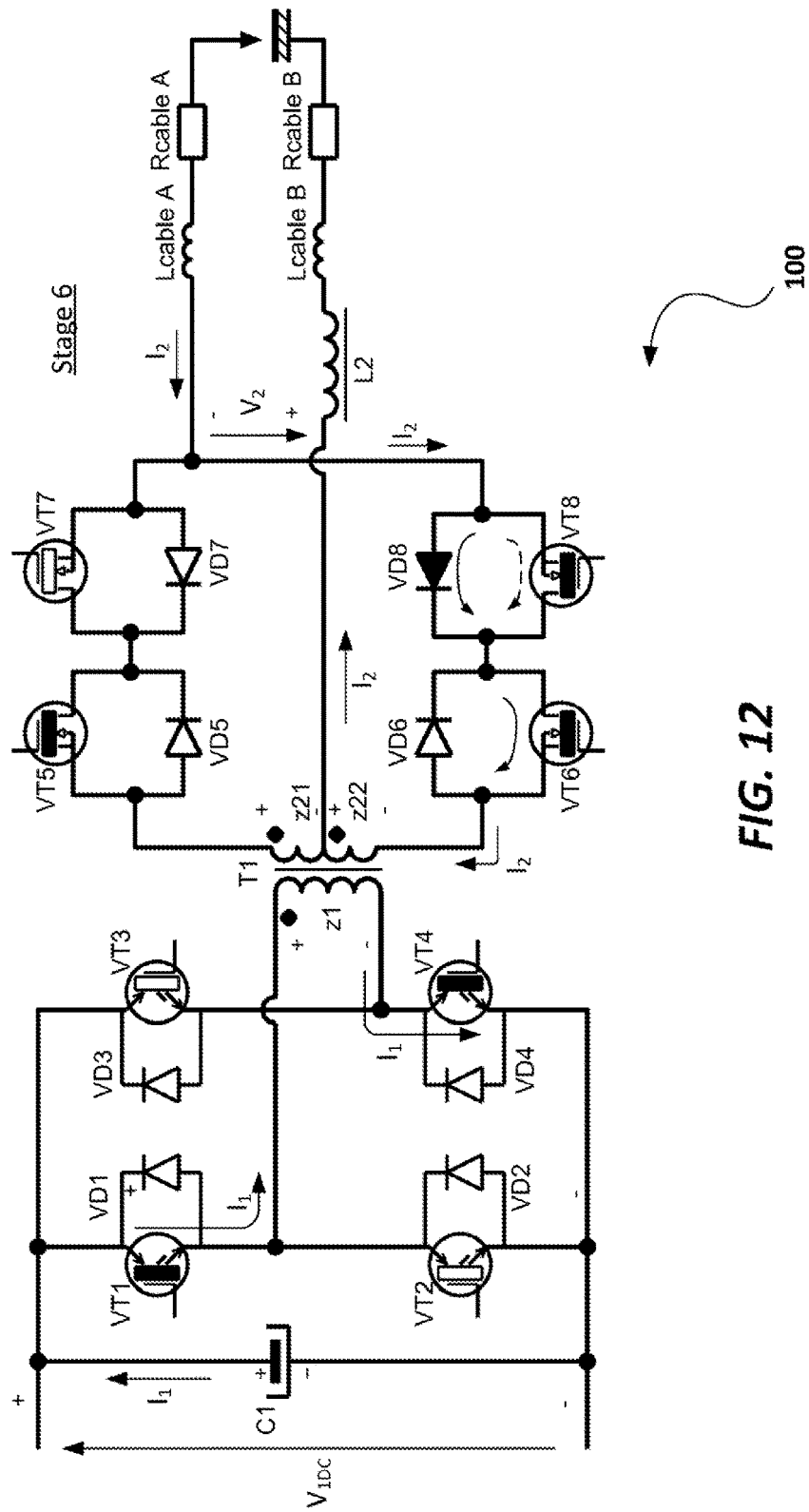
Figure 13:
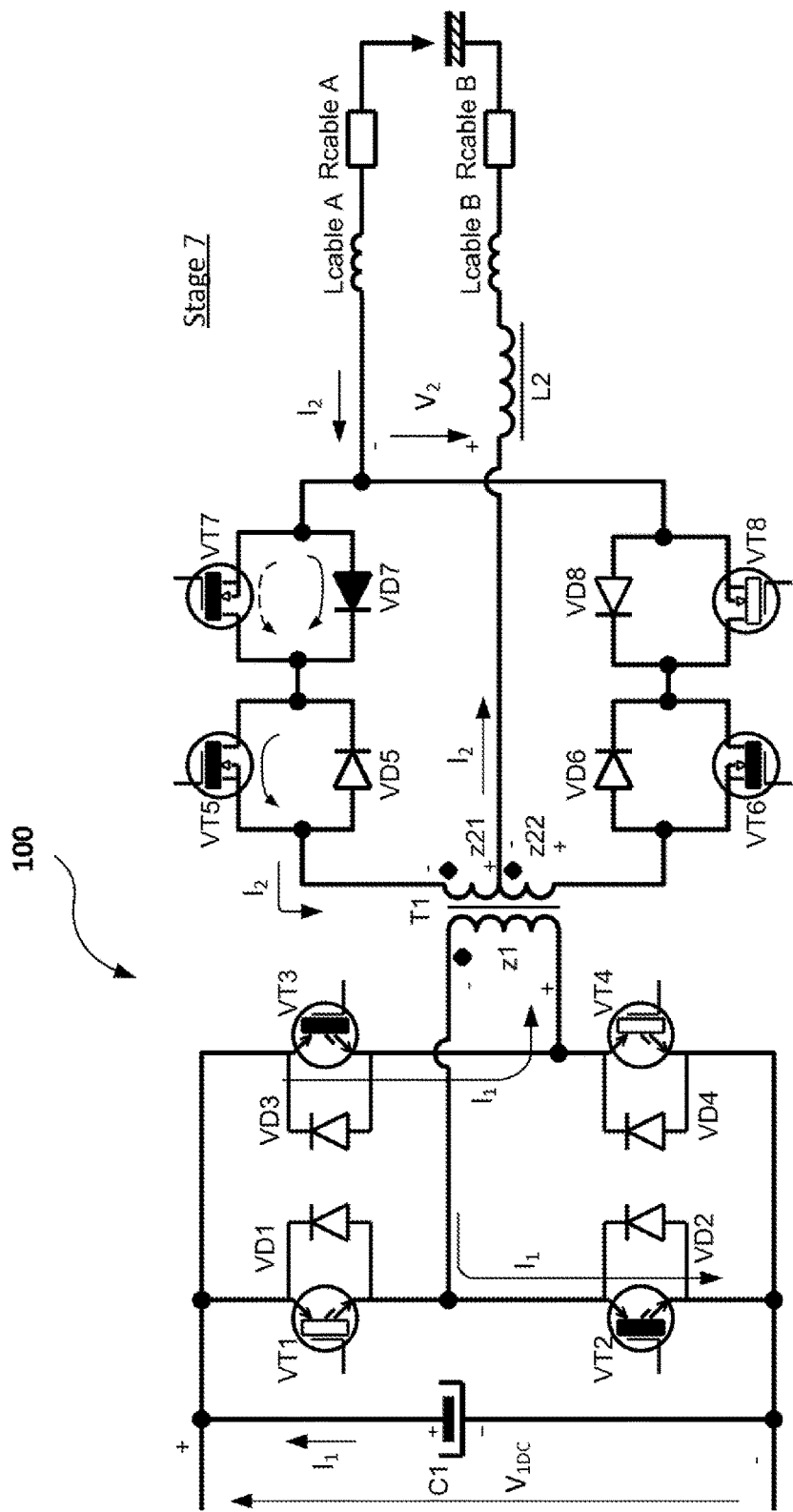

In stage 6 and stage 7, shown in FIG. 12 and FIG. 13, respectively, power transfer takes place from the primary side to the secondary side, where the power is of a second output voltage polarity, and a of second output current direction corresponding to the voltage polarity. Stages 6 and stage 7 are analogous to stages 1 and stage 2 but with reverse direction of the output current and reverse polarity the output voltage. Operation of the primary side switches (VT1-VT4) remains the same as for stage 1 and stage 2. Functioning of switches and rectifiers of the secondary side is swapped in pairs. On the secondary side, at stage 6 switches VT5, VT6 and VT8 are switched on; due to polarity of the output voltage, the switch VT5 is not conducting. Rectifier VD8 is conducting in parallel with the switch VT8. At the stage 7 switches VT5, VT6, and VT7 are switched on, while due to polarity of the output voltage, the switch VT6 is not conducting. Rectifier. VD7 is conducting in parallel with the switch VT7.

Figure 14:
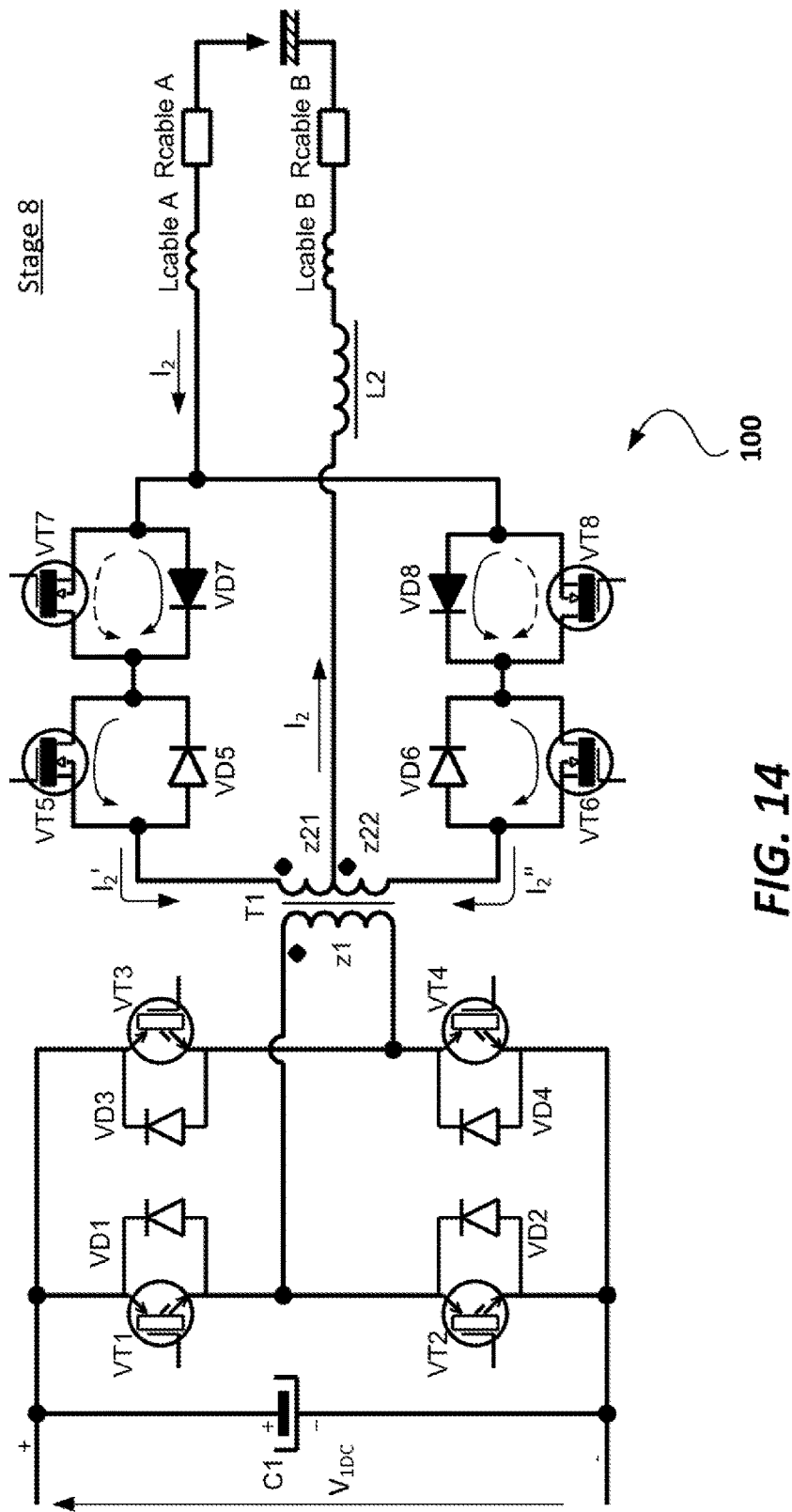

Turning to FIG. 14, there is shown a stage 8 corresponding to free-wheeling operation at the current of the second direction. In this stage, all primary switches VT1, VT2, VT3, and VT4 are switched off. Both switches VT5 and VT6 are switched on and the secondary current flows in parallel through the switches and rectifiers VD7, VT7 and VD8, VT8.

Figure 15:
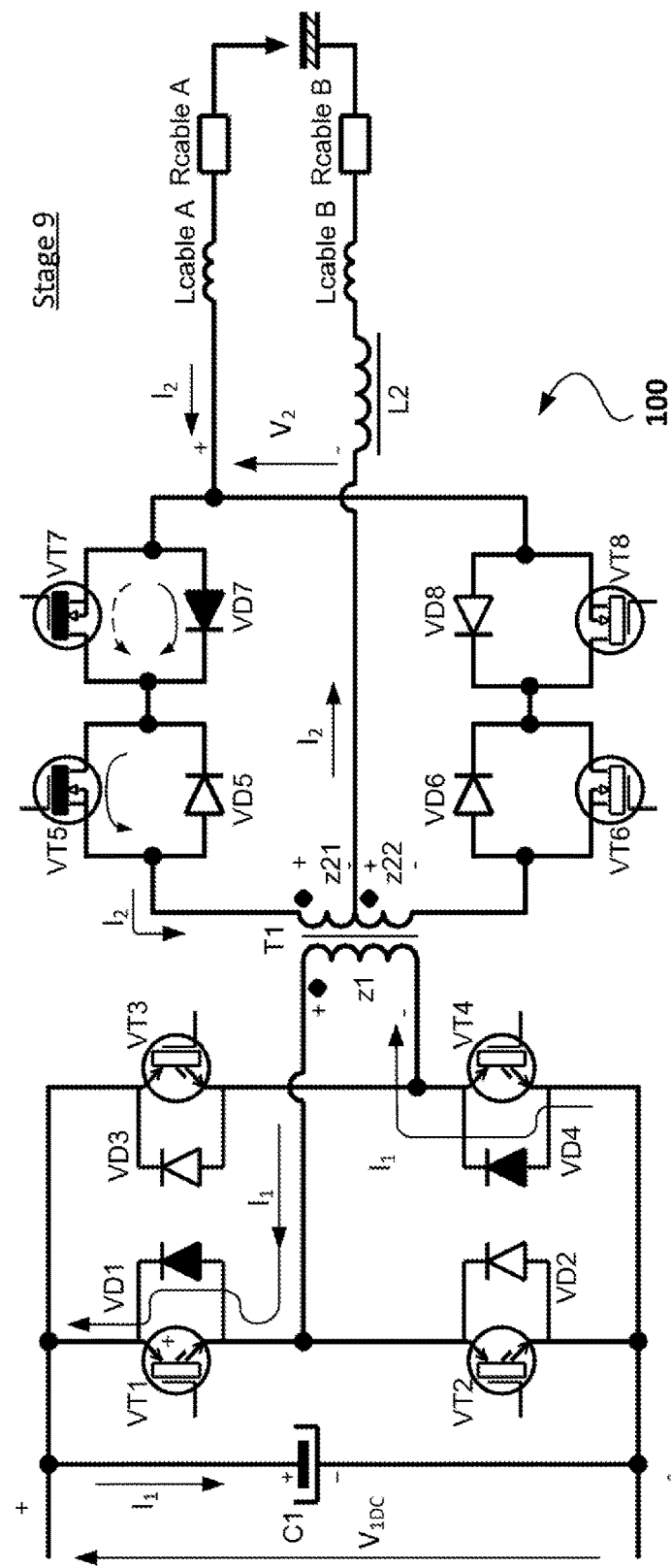
Figure 16:
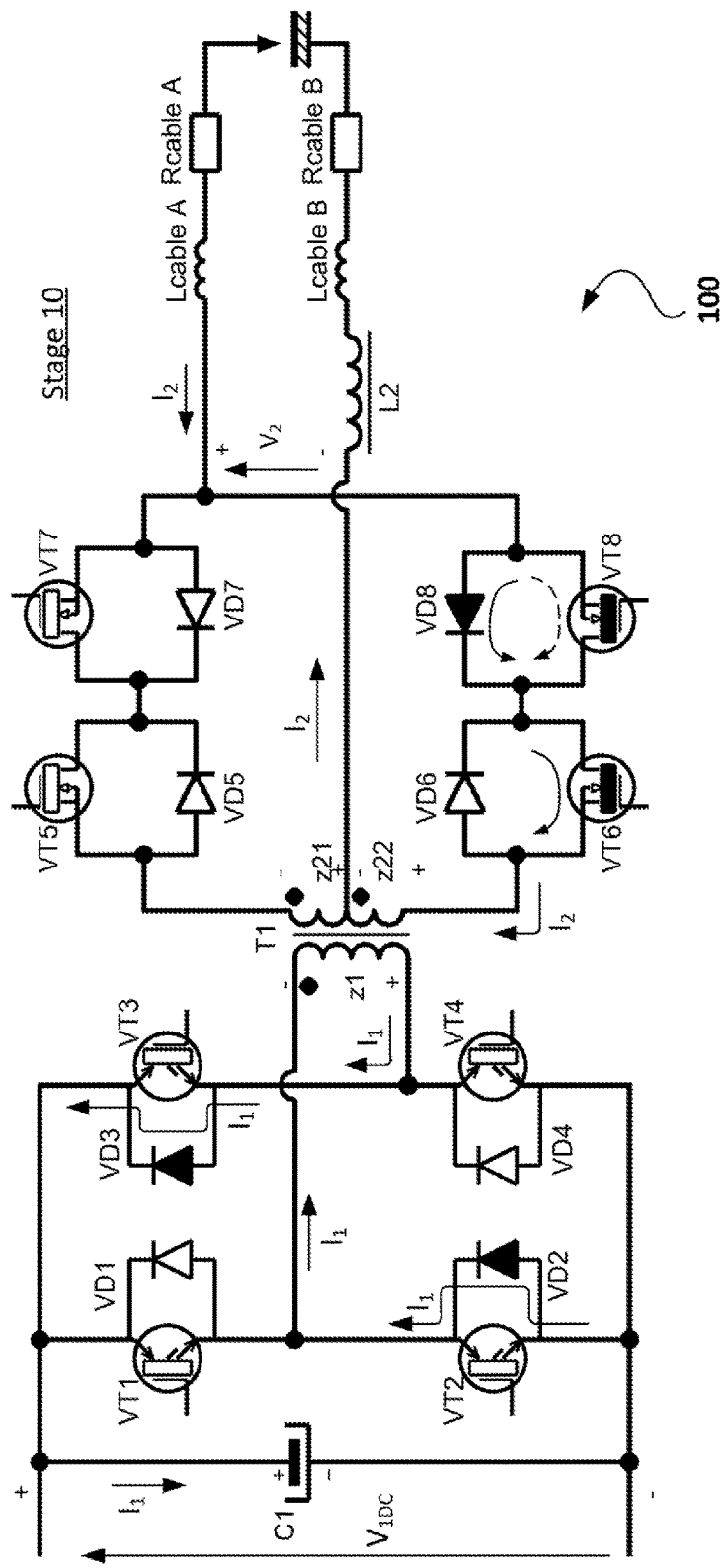

Turning now to FIG. 15 and FIG. 16, there are shown the stage 9 and stage 10, respectively. In these stages power transfer takes place from the secondary side to primary side, where the voltage is of a first polarity and an output current flows as a reverse current in the second direction, oppositely to the voltage polarity.

In stages 9 and 10 all primary switches are switched off. Conduction on the primary side is possible just through the primary rectifiers VD1, VD2, VD3, VD4, which rectifiers form a bridge rectifier. As shown in FIG. 15, in stage 9 the switch VT6 is switched off. Due to energy accumulated in the output inductors, the secondary current flows in the second direction. Secondary current flows through the switch VT5, rectifier VD7 in parallel with the switch VT7 and secondary winding z21. Since neither secondary windings nor primary windings are short-circuited, the secondary current is transformed to the primary side and flows back to the accumulating capacitor C1, via diodes VD1 and VD4, forcing the voltage of the first polarity on the transformer's winding. The energy accumulated in inductors flows back to the input capacitor C1.

In analogous fashion to the scenario of FIG. 15, as shown in FIG. 16, in stage 10 the switch VT5 is switched off. Due to energy accumulated in the output inductors, the secondary current flows in the first direction. Secondary current flows through the switch VT6, rectifier VD8 in parallel with the switch VT8 and secondary winding z22. Since neither secondary windings nor primary windings are short-circuited, the secondary current is transformed to the primary side and flows back to the accumulating capacitor C1, via diodes VD2 and VD3, forcing the voltage of the first polarity on the transformer's winding. The energy accumulated in inductors flows back to the input capacitor C1.

Notably, the welding power supplies of the embodiments as disclosed herein may operate in other stages, related to the non-ideality of a real electric circuit, understood as the presence of parasitic capacitors and stray inductances, and the necessity in establishing the conduction and restoration of the blocking capacity in semiconductor devices. Since those stages are not germane to the present embodiments the stages will be not included in the present description. In practical embodiments, these stages may be taken into consideration.

In various embodiments, welding may be performed over a plurality of welding cycles such as AC welding cycles, where a given welding cycle includes a series of operation modes. A given welding cycle may span a duration of a few milliseconds to tens of milliseconds in some embodiments. The embodiments are not limited in this context. During a given operation mode a sequence of stages may be performed, based upon the stages shown in FIGS. 7-16, for example. In various embodiments, the sequence of stages may be performed multiple times within a given operation mode.

In one embodiment, the operation mode of power delivery with a first polarity (mode I) is conducted according to the sequence of stages: 1-3-2-3-1-3-2-3- . . . . The average output voltage of a first polarity, and consequently the power and the output current, may be controlled by the principle of pulse width modulation (PWM), where the ratio between periods of delivery of the energy from the primary side and free-wheeling periods, when the energy from the primary side is not delivered, is regulated. In this way, average output voltage of a given polarity can be regulated from zero to certain maximum. The period of the operation, measured by the sum of times of consequent stages: 1, 3, 2 and next stage (3) may have duration between 100 μS down to 10 μS or less, and may be constant or may vary, depending on the variation of the type of the applied PWM control method. In practical embodiments sequence 1-3-2-3-1-3-2-3- . . . of the mode I may include additional stages required because of imperfection of semiconductor devices, which devices need certain time for acquiring state of the conduction and certain time for restoration of the blocking state as well as due to presence of the parasitic components in the circuit.

In further embodiments, if required by certain conditions, the operation mode of power recovery (recuperation) for a first polarity of the output current (mode IV) may be conducted according to the sequence of stages: 4-3-5-3-4-3-5-3 . . . . The power accumulated in the output inductors is transferred to the input, while the output current has a first direction. The principle of PWM may be applied in the mode IV for regulating the ratio between power reverse stages, that is, recuperation stages 4 and 5, and the free-wheeling stage 3. In this way the average output voltage of the second polarity can be controlled in the presence of the output current of the first direction in an analogous way as control is performed in the mode I. In further embodiments, the mode IV sequence may also include stages 1 and 2 for commutation purposes. During the transition from the free-wheeling stage 3 to recuperation stage 4 or 5 termination of the secondary current by means of the secondary switches due to leakage inductance of the transformer may not be desirable. Therefore, the stage 1 or stage 2 is applied for a relatively short time, just to force the output current to flow just through the one winding z21 or z22. The respective secondary switch VT7 or VT8 is switched off in a zero current switching condition (ZCS) starting the respective recuperation stage, recuperation stage 4 or 5. When stages 1 and 2 are applied in the mode IV, the sequence of the stages may be as follows: 3-1-4-3-2-5-3-1-4-3- . . . . The last sequence may be extended further by additional stages required because of parasitic components in the circuit as well as non-ideality of semiconductor devices. For example, such devices need a certain time for acquiring a state of conduction, and a certain time for restoration of the blocking state.

In further embodiments, the operation mode of power delivery with a second polarity (mode III) is conducted according to the sequence of stages: 6-8-7-8-6-8-7-8- . . . . The output voltage, and consequently the power and the current is controlled by the principle of pulse width modulation (PWM), where a ratio between periods of delivery of the energy and free-wheeling periods may be controlled in the same manner as for the mode I. The mode III may require additional stages in the sequence of control in the same way as may be required for the mode I.

In further embodiments, the operation mode of power recovery for a second direction of the output current (mode II) is conducted according to the sequence of stages 8-9-8-10-8-9-8-10-8- . . . . The power accumulated in the output inductors is transferred to the input and the output current has a second direction. The mode II sequence may also require an addition of stages 6 and 7 for switching off switches VT5 and VT6 in ZCS condition. When stages 6 and 7 are applied in the mode II, the sequence of the stages may be as follows: 8-7-9-8-6-10-8-7-9-8-6-10-8- . . . . The last sequence may be extended further by the additional stages required because of parasitic components in the circuit and non-ideality of semiconductor devices, as noted above.

In an additional embodiment, the operation of converters having topologies depicted in FIG. 5 with additional windings z23 and z24, involves the same delivery of power to the welding load during mode I and mode III, or during recovery modes: mode IV or mode II. An additional mode of operation, mode Ie may be added to listed modes I, IV, III and II. The mode Ie, where the power is delivered to the load and the voltage of the first polarity is increased due to employment of serially connected additional windings of the transformer T1. The mode employs an active rectifier, which device includes rectifiers VD9, VD11 and switches VT10, VT12. Rectifiers VD10 and VD12 are embedded parts of the devices, but do not play an active role in the present topology. The mode Ie include 3 stages similar to stages in the mode I. Stage 11 is an analog to stage 1. On the primary side, switches VT1 and VT4 are switched on. On the secondary side, switches VT10 and VT12 are switched on too. The voltage of the first polarity and increased level equal the voltage on the both windings z21 and z23 appears on the output. The output current of the first direction flows through the rectifier VD9 and the switch VT10. Similarly, in stage 12, analog to stage 2, primary side switches VT2, VT3 are switched on. The output voltage has the first polarity and increased value equal the voltage on the both windings z22 and z24. The output current of the first direction flows through the rectifier VD11 and the switch VT12. Free-wheeling stage 13 is similar to the stage 3. All switches on the primary side are off. Transformer output is shorted because the output current of the first direction flows simultaneously through the both rectifiers VD9 and VD11 and the both switches VT10 and VT12. The mode Ie is similar to the mode I. The sequence of stage is 11-13-12-13-11-13- . . . . The average output voltage of the first polarity may be regulated using the same principle of the PWM as in previous four modes.

The utilization of the additional windings z23 and z24 and active rectifier that includes rectifiers VD9, VD11 and switches VT10, VT12 as presented in FIG. 5 enables an operation in the mode IVe similar to the mode IV, where the average output voltage has the second polarity and the output current flows in the first direction. The difference between mode IV and mode IVe is that the switches VT5, VT6, VT7, VT8 are permanently off, rectifiers VD5, VD6, VD7, VD8 are not conducting. The mode IVe includes the same free-wheeling stage, free-wheeling stage 13, where all for devices VD9, VD11, VT10, VT12 are conducting simultaneously. In the next stage, stage 14, the output current of the first direction flows just through the rectifier VD9 and switch VT10. The switch VT12 is switched off. In this stage voltage of the second polarity and increased value appears on the output. The output current is transformed to the primary side and flows through the rectifiers VD2 and VD3 to the DC link capacitor C1. Similarly, in the stage 15 the output current of the first direction flows through the rectifier VD11 and switch VT12, while the switch VT10 is switched off. The output current is transformed to the primary side and flows to the capacitor C1 through the rectifiers VD1 and VD4. Basically, the mode IVe is a sequence 13-14-13-15-13-14- . . . . The mode IVe may require implementation of additional stages except the stage 13, stage 14 and stage 15. While in the mode IVe primary switches are not intended to operate, they may be employed to force the ZCS condition for switching off the switches VT10 and VT12 on the transition between free-wheeling stage 13 and the recuperation stages, that is, stage 14 and stage 15.

In further embodiments, utilization of the additional windings z23 and z24 and active rectifier that is made of rectifiers VD9, VD11 and switches VT10, VT12 as depicted on the FIG. 5 may require more stages of operation for transitions between operation with additional windings and the operation without additional windings. In particular, additional stages with utilization of the primary switches may be applied to force ZCS condition for switching off switches VT10 and VT12 during transition to the free-wheeling stage with utilization of the windings z21, z2 and switches VT5, VT6, VT7, VT8, and rectifiers VD5, VD6, VD7, VD8.

In additional embodiments, the operation of converters having topologies depicted in FIG. 6 with additional windings z23 and z24, involves the same delivery of power to the welding load during mode I and mode III, or during recovery modes IV or II, where the switches and rectifiers VT5, VT6, VT7, VT8 and VD5, VD6, VD7, VD8 are substituted by VT9, VT10, VT11, VT12, VD9, VD10, VD11, VD12, respectively. This topology enables modes Ie and IVe as described for the topology on the FIG. 5. In the embodiment according to FIG. 6 a mode IIIe, analogous to the mode Ie, have a place, when the output voltage has a second polarity and an extended value due to use of the additional windings z23 and z24 and the second direction of the output current. The mode IIIe includes basically three stages: free-wheeling stage 16—free-wheeling of the second direction of the output current, stage 17—power delivery with output voltage of the second polarity and the current of the second direction flowing through the switch VT9 and the rectifier VD10, stage 18, with output voltage of the second polarity and the current of the second direction flowing through the switch VT11 and the rectifier VD10.

Consequently, a further embodiment according to FIG. 6 may provide a mode IIIe, analogous to the mode IVe, where current has a second direction and the output voltage has a first polarity. Mode IIIe may operate similarly to mode IVe, except the free-wheeling stage 16 may include stages 19 and 20, when the energy accumulated in the output inductances goes back to the capacitor C1. Mode IIe may similarly include additional stages with utilization of the primary switches VT1, VT2, VT3, VT4 in purpose to force ZCS for switching off the switches VT9 and VT11. Similarly to topology presented in FIG. 5 operation of the present topology may require additional stages during the transitions to the free-wheeling stage with employment of just z21 and z22 windings and devices VT5, VT6, VT7, VT8, VD5, VD6, VD7, VD8.

Power converters of embodiments presented in FIGS. 2, 3, 4, 5, 6 are capable of operating in modes I, IV, III IV, which modes are equal to operation in quadrants I, IV, III, II on the plane of output voltage and current. Those converters can deliver power of the first and second polarity of the output voltage and reverse the voltage to transfer energy from the secondary to primary side. In particular, in welding applications those converters can be utilized for unipolar power delivery, for power supplies that can reverse of the output voltage, for power supplies where the acceleration of the transitions of the current transpires without changing the direction of the current, but with the reverse of the voltage and eventually, to deliver low frequency AC output power with capacity of fast current transitions. The alternating current application covers all other applications, and thus will further described solely.

Alternating current operation of the converter is the sequence for all four modes: mode I, mode IV, mode III, mode II. Depending on topology employed, and the needs of operation, an extended voltage may be applied in all modes during the current transitions. Then modes Ie, IVe, IIIe, IIe may be employed for a temporary increase of voltage and speed up of transition of the current. Modes IV and II in welding applications may or may not be applied. The role of those modes is to speed up the current transitions. If converters of the presented topologies are used in applications different than welding, in particular, in application to the loads that may change the role from the consumer of the energy to deliverer of the energy, modes IV and II may be employed even for permanent conversion with energy flow from the load to the input.

Figure 17:
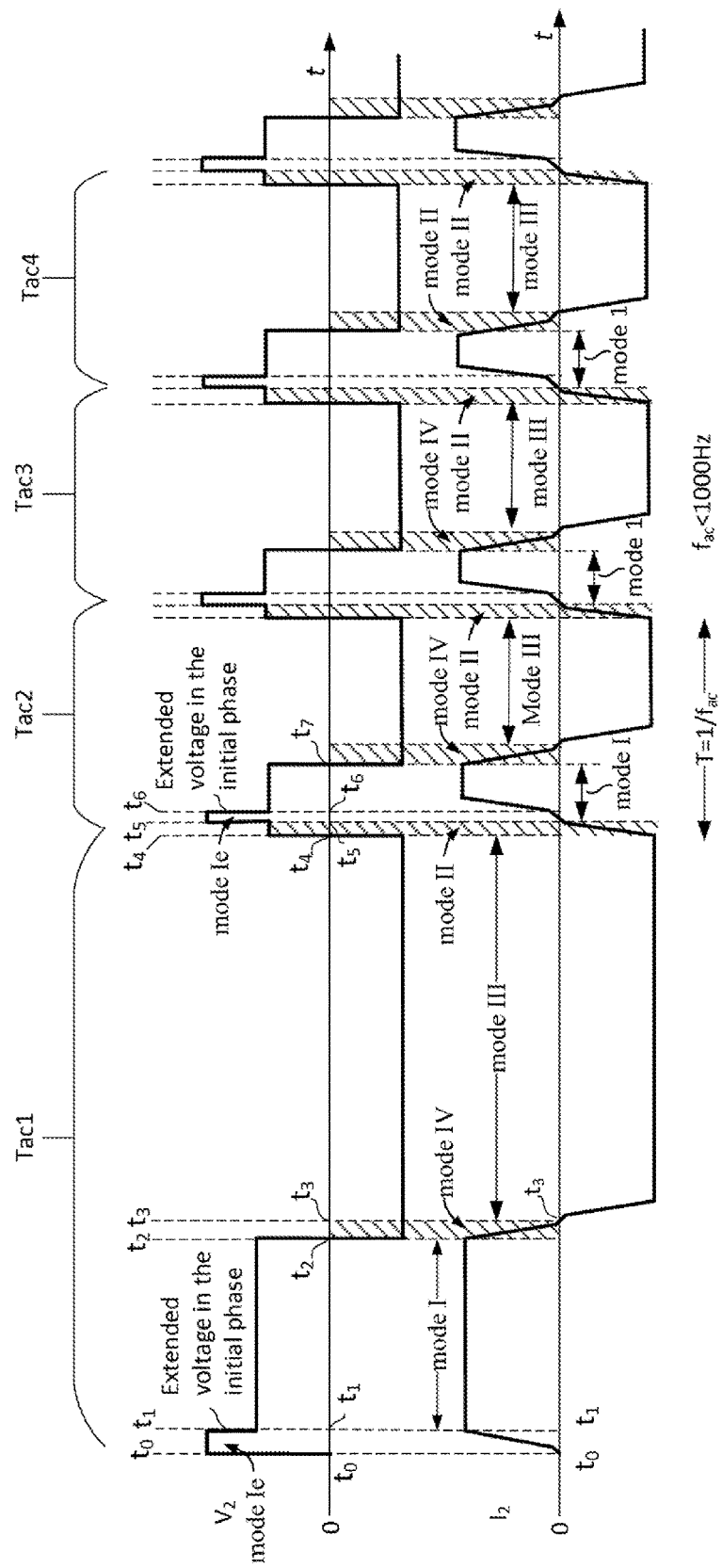
FIG. 17 presents timing diagrams for AC operation of a power supply according to embodiments of the disclosure.

Exemplary timing diagrams of operation in the AC operation are presented in FIG. 17. The diagrams present the operation of the converter of the topology with unipolar extended voltage as shown in FIG. 5. A plurality of welding cycles are shown as Tac1, Tac2, Tac3, Tac4, where in a given welding cycle, the sequence of the operation modes is: mode I-mode IV-mode III-mode II-mode I-mode IV . . . . As an example in FIG. 17 the extended voltage was applied just in mode Ie in purpose to speed up the current transition. Therefore, the FIG. 17 time diagram is applicable to the topology presented in FIG. 5 or FIG. 6. Extended voltage can be used also during the other transitions, in purpose to accelerate the change of the output current. Converter of topology presented in the FIG. 5 may employ also mode IVe, while converter of topology presented in the FIG. 6 may additionally utilize modes IIIe and IIe. For simplicity those instances were not presented on the FIG. 17.

In summary, the present embodiments provide novel architecture and methods for operating power supplies in four quadrants. In one embodiment a primary converter of a power supply may include a full bridge converter (full bridge inverter) comprising four active switches and four rectifiers, and an isolating transformer with secondary winding that has two ends and central tap, and an output converter may comprise two four state controlled conductivity switches.

In a further embodiment, the four state controlled conductivity switches of the output converter may comprise two controlled rectifiers connected in parallel, or switches of one direction controlled conductivity connected in series with each other and each connected in parallel with a rectifiers, providing a reverse conductivity.

In another embodiment, the isolating transformer may comprise two auxiliary windings, and the output converter may comprise two auxiliary controlled rectifiers or two four state controlled conductivity switches, providing capacity of temporary increase of the output voltage, respectively in one polarity or in both polarities of the output voltage.

In another embodiment, a method of operating a power supply for welding or other purposes may include operation in four modes of operation, providing regulated output voltage of two polarities, regulated reverse power flow of two directions of an output current, and by combination of available modes of operation providing an alternating current output of a low frequency.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below are to be construed in view of the full breadth and spirit of the present disclosure as described herein.

What is claimed is:

1. A power supply, comprising:
a primary pre-converter, the primary pre-converter coupled to receive power from supplying mains, and configured to receive an alternating current (AC) voltage at low frequency and output a high DC voltage, and further configured to receive the high DC voltage and to output the alternating current;
a primary converter, the primary converter disposed on a primary side of the power supply and coupled to the high DC voltage from the primary pre-converter;
an isolating transformer coupled to receive a high frequency AC voltage from the primary converter and output a high frequency secondary AC voltage, and coupled to receive a high frequency secondary AC current and to output primary high frequency AC current; and
an output converter, the output converter being disposed on a secondary side of the power supply, wherein the output converter is configured to receive high frequency AC voltage from the isolating transformer and to output a DC voltage of a first or of a second polarity to an output, and wherein the output converter is configured to receive DC current of a first or a second direction from the output and to output a high frequency AC current to the isolating transformer;
wherein the isolating transformer comprises a secondary winding having a first end, a second end and a central tap, the output converter comprising:
a four-state controlled conductivity switch, including a first switch and a second switch, the first switch and the second switch having four-state controlled conductivity,
wherein in response to a control signal, the output converter is configured to:
conduct a current flow in a first direction and block the current flow in a second direction,
to conduct the current flow in the second direction and block the current flow in the first direction,
to block the current flow in the first direction and the second direction, or
to conduct the current in the first direction and the second direction, and
wherein the isolating transformer comprises:
a first auxiliary winding coupled to the first end of the secondary winding;
a second auxiliary winding coupled to the second end of the secondary winding;

a first auxiliary controlled rectifier, wherein a first side of the first auxiliary controlled rectifier is coupled to an end of the first auxiliary winding; and
a second auxiliary controlled rectifier, wherein a first side of the second auxiliary controlled rectifier is coupled to the end of the first auxiliary winding, and
wherein a second side of the first auxiliary controlled rectifier and the second side of the second auxiliary controlled rectifier are coupled together to the first switch and to the second switch.

2. The power supply of claim 1, comprising an input capacitor, the input capacitor being disposed across a DC link between the primary pre-converter and the primary converter, the input capacitor coupled to balance a power flow between the primary pre-converter and the primary converter by a reception of reverse current, the reverse current flowing from the secondary side to the primary side.

3. The power supply of claim 1, further comprising a control system, the control system coupled to the primary converter and to the output converter, the control system providing control signals to the primary converter and the output converter, wherein the control signals determine bipolar output voltage and bidirectional power flow operation.

4. The power supply of claim 1, wherein the primary converter is configured to control power delivered to the secondary side by controlling an average output voltage by means of pulse width modulation, and configured to force conditions of operation of the output converter.

5. The power supply of claim 1, the output converter comprising a plurality of switches and rectifiers that rectify secondary high frequency AC voltage taken from the isolating transformer to a DC voltage of a first or a second polarity, or by combination of two polarities to create an AC voltage of the low frequency.

6. The power supply of claim 1, the output converter comprising a plurality of switches and rectifiers, the output converter configured to invert with high frequency an output current flowing in a first or a second direction and to feed the isolating transformer with AC current of a high frequency.

7. The power supply of claim 1,
wherein a first side of the first switch is coupled to the first end of the secondary winding; and
wherein a first side of the second switch is coupled to the second end of the secondary winding,
wherein a second side of the first switch and a second side of the second switch are coupled to a first output pole, directly or indirectly through an inductor; and
wherein a second output pole is coupled to the central tap of the isolating transformer, directly or through the inductor.

8. The power supply of claim 1,
wherein the four-state controlled conductivity switch further comprises:
two switches of unidirectionally controlled conductivity, connected in series; and
two rectifiers,
wherein a first rectifier is connected in parallel to the first switch to provide permanent conductivity in a first given direction, opposite to a second given direction controlled by the first switch,
wherein a second rectifier is connected in parallel to the second switch to provide a permanent conductivity in third given direction, opposite to a fourth given direction controlled by the second switch, and
wherein the first rectifier and the second rectifier are connected in series, having opposite directions.

9. The power supply of claim 1,
wherein the four-state controlled conductivity switch further comprises two controlled rectifiers, connected in parallel, and
wherein a first controlled rectifier is connected in a direction opposite to a direction of a second controlled rectifier.

10. The power supply of claim 1, wherein the primary converter comprises:
a primary inverter, configured to receive the high DC voltage and to output high frequency AC voltage; and
a primary rectifier, configured to receive a high frequency AC current and output a DC current.

11. A power supply, comprising:
a primary pre-converter, the primary pre-converter coupled to receive power from supplying mains, and configured to receive an alternating current (AC) voltage at low frequency and output a high DC voltage, and further configured to receive the high DC voltage and to output the alternating current;
a primary converter, the primary converter disposed on a primary side of the power supply and coupled to the high DC voltage from the primary pre-converter;
an isolating transformer coupled to receive a high frequency AC voltage from the primary converter and output a high frequency secondary AC voltage, and coupled to receive a high frequency secondary AC current and to output primary high frequency AC current; and
an output converter, the output converter being disposed on a secondary side of the power supply, wherein the output converter is configured to receive high frequency AC voltage from the isolating transformer and to output a DC voltage of a first or of a second polarity to an output, and wherein the output converter is configured to receive DC current of a first or a second direction from the output and to output a high frequency AC current to the isolating transformer,
wherein the isolating transformer comprises a secondary winding having a first end, a second end and a central tap, the output converter comprising:
a four-state controlled conductivity switch, including a first switch and a second switch, the first switch and the second switch having four-state controlled conductivity,
wherein in response to a control signal, the output converter is configured to:
conduct a current flow in a first direction and block the current flow in a second direction,
to conduct the current flow in the second direction and block the current flow in the first direction,
to block the current flow in the first direction and the second direction, or
to conduct the current in the first direction and the second direction, and wherein the isolating transformer comprises:
a first auxiliary winding, coupled to the first end of the secondary winding;
a second auxiliary winding, coupled to the second end of the secondary winding;
a first auxiliary four-state controlled conductivity switch, wherein a first side of a first controlled auxiliary switch is coupled to the first auxiliary winding; and
a second auxiliary four-state controlled conductivity switch, wherein a first side of a second auxiliary controlled switch is coupled to the second auxiliary winding,
and wherein a second side of the first auxiliary switch and a second side of the second auxiliary switch are coupled together to the second side of the first auxiliary four-state controlled conductivity switch and the second side of the second auxiliary four-state controlled conductivity switch.

12. The power supply of claim 11, comprising an input capacitor, the input capacitor being disposed across a DC link between the primary pre-converter and the primary converter, the input capacitor coupled to balance a power flow between the primary pre-converter and the primary converter by a reception of reverse current, the reverse current flowing from the secondary side to the primary side.

13. The power supply of claim 11, further comprising a control system, the control system coupled to the primary converter and to the output converter, the control system providing control signals to the primary converter and the output converter, wherein the control signals determine bipolar output voltage and bidirectional power flow operation.

14. The power supply of claim 11, wherein the primary converter is configured to control power delivered to the secondary side by controlling an average output voltage by means of pulse width modulation, and configured to force conditions of operation of the output converter.

15. The power supply of claim 11, the output converter comprising a plurality of switches and rectifiers that rectify secondary high frequency AC voltage taken from the isolating transformer to a DC voltage of a first or a second polarity, or by combination of two polarities to create an AC voltage of the low frequency.

16. The power supply of claim 11, the output converter comprising a plurality of switches and rectifiers, the output converter configured to invert with high frequency an output current flowing in a first or a second direction and to feed the isolating transformer with AC current of a high frequency.

17. The power supply of claim 11, wherein the primary converter comprises:
a primary inverter, configured to receive the high DC voltage and to output high frequency AC voltage; and
a primary rectifier, configured to receive a high frequency AC current and output a DC current.

* * * * *